United States Patent
Sharma et al.

(10) Patent No.: US 10,848,432 B2
(45) Date of Patent: Nov. 24, 2020

(54) SWITCH FABRIC BASED LOAD BALANCING

(71) Applicant: Cisco Technology, Inc., San Jose, CA (US)

(72) Inventors: Samar Sharma, San Jose, CA (US); Deepak Cherian, Newark, CA (US); Manish Chandra Agrawal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 15/823,860

(22) Filed: Nov. 28, 2017

(65) Prior Publication Data
US 2018/0176145 A1    Jun. 21, 2018

Related U.S. Application Data

(60) Provisional application No. 62/435,844, filed on Dec. 18, 2016.

(51) Int. Cl.
*H04L 12/911* (2013.01)
*H04L 29/08* (2006.01)
(Continued)

(52) U.S. Cl.
CPC .......... *H04L 47/726* (2013.01); *H04L 47/125* (2013.01); *H04L 47/25* (2013.01); *H04L 67/1004* (2013.01); *H04L 47/829* (2013.01)

(58) Field of Classification Search
CPC ..... H04L 47/726; H04L 47/25; H04L 47/125; H04L 47/829; H04L 67/1004
See application file for complete search history.

(56) References Cited

U.S. PATENT DOCUMENTS 6,175,874 B1    1/2001   Imai et al.
6,259,705 B1    7/2001   Takahashi
(Continued)

FOREIGN PATENT DOCUMENTS

WO    WO-2015175567 A1 *  11/2015   ........... H04L 47/125
WO    WO-2016058519 A1 *   4/2016   ............... G06F 9/46

OTHER PUBLICATIONS

Karadeniz, et al., "Hardware Design and Implementation of a Network-on-Chip Based Load Balancing Switch Fabric", IEEE, Dec. 2012, 7 pgs.
(Continued)

*Primary Examiner* — Kostas J Katsikis
(74) *Attorney, Agent, or Firm* — Edell, Shapiro & Finnan, LLC

(57) ABSTRACT

A switch/switching fabric is configured to load balance traffic. The switch fabric includes a plurality of switches. A packet is received at a first switch of the plurality of switches. The first switch load balances the packet to a particular entity among a plurality of entities. Each of the entities is connected to one of the plurality of switches. The first switch determines a particular switch of the plurality of switches to which the packet should be directed, the particular entity being connected to the particular switch of the plurality of switches. The particular switch receives the packet, and determines which interface of the particular switch to direct the packet to the particular entity. The plurality of entities include servers and network appliances as physical devices or virtual machines.

20 Claims, 20 Drawing Sheets

(51) Int. Cl.
*H04L 12/803* (2013.01)
*H04L 12/825* (2013.01)

(56) References Cited

U.S. PATENT DOCUMENTS

| | | | |
|---|---|---|---|
| 6,601,084 B1 | 7/2003 | Bhaskaran et al. | |
| 6,643,260 B1 | 11/2003 | Kloth et al. | |
| 6,683,873 B1 | 1/2004 | Kwok et al. | |
| 6,735,631 B1 | 5/2004 | Oehrke et al. | |
| 6,779,039 B1 | 8/2004 | Bommareddy et al. | |
| 6,996,615 B1 | 2/2006 | McGuire | |
| 7,062,571 B1 | 6/2006 | Dale et al. | |
| 7,284,053 B1* | 10/2007 | O'Rourke | H04L 47/10 709/226 |
| 7,313,667 B1 | 12/2007 | Pullela et al. | |
| 7,328,237 B1 | 2/2008 | Thubert et al. | |
| 7,415,523 B2 | 8/2008 | O'Rourke et al. | |
| 7,536,476 B1 | 5/2009 | Alleyne | |
| 7,542,423 B1 | 6/2009 | Morishige et al. | |
| 7,567,504 B2 | 7/2009 | Darling et al. | |
| 7,623,455 B2 | 11/2009 | Hilla et al. | |
| 7,808,897 B1 | 10/2010 | Mehta et al. | |
| 7,852,774 B2 | 12/2010 | Shen et al. | |
| 8,259,722 B1 | 9/2012 | Kharitonov | |
| 8,284,664 B1 | 10/2012 | Aybay et al. | |
| 8,467,294 B2 | 6/2013 | Raman et al. | |
| 8,510,469 B2 | 8/2013 | Portolani | |
| 8,553,552 B2 | 10/2013 | Hu et al. | |
| 8,601,084 B2 | 12/2013 | Carlander | |
| 8,611,356 B2 | 12/2013 | Yu et al. | |
| 8,724,628 B1* | 5/2014 | Aybay | H04L 49/1515 370/392 |
| 8,868,726 B1 | 10/2014 | Tu et al. | |
| 8,937,942 B1 | 1/2015 | Li et al. | |
| 8,989,049 B2* | 3/2015 | Yang | H04L 47/125 370/221 |
| 9,008,095 B2* | 4/2015 | Kapadia | H04L 45/745 370/351 |
| 9,154,445 B2* | 10/2015 | Tripathi | H04L 49/25 |
| 9,160,668 B2* | 10/2015 | Tripathi | H04L 49/253 |
| 9,246,998 B2 | 1/2016 | Kumar et al. | |
| 9,300,576 B2* | 3/2016 | Tripathi | H04L 41/5019 |
| 9,304,782 B2* | 4/2016 | Tripathi | G06F 9/4416 |
| 9,306,849 B2* | 4/2016 | Tripathi | H04L 45/66 |
| 9,397,946 B1 | 7/2016 | Yadav | H04L 41/0806 |
| 9,432,294 B1 | 8/2016 | Sharma et al. | |
| 9,444,634 B2* | 9/2016 | Pani | H04L 61/2007 |
| 9,444,744 B1 | 9/2016 | Sharma et al. | |
| 9,485,115 B2* | 11/2016 | Kapadia | H04L 45/02 |
| 9,590,820 B1* | 3/2017 | Shukla | H04L 12/4633 |
| 9,590,824 B1* | 3/2017 | Sikand | H04L 12/4666 |
| 9,590,914 B2* | 3/2017 | Alizadeh Attar | H04L 49/25 |
| 9,660,938 B2* | 5/2017 | Janakiraman | H04L 49/10 |
| 9,742,697 B2* | 8/2017 | Tripathi | H04L 49/1523 |
| 9,825,865 B1 | 11/2017 | Sharma et al. | |
| 9,858,104 B2* | 1/2018 | Tripathi | G06F 9/45558 |
| 10,003,538 B2* | 6/2018 | Avci | H04L 47/125 |
| 10,009,275 B1 | 6/2018 | Singh | H04L 45/745 |
| 10,069,734 B1* | 9/2018 | Singh | H04L 47/15 |
| 10,084,718 B1* | 9/2018 | Abts | H04L 47/60 |
| 10,091,087 B2* | 10/2018 | Raja | G06F 16/278 |
| 10,097,467 B1* | 10/2018 | Singh | H04L 47/125 |
| 10,116,530 B2* | 10/2018 | Yadav | G06F 21/53 |
| 10,116,567 B1* | 10/2018 | Singh | H04L 47/122 |
| 10,142,353 B2* | 11/2018 | Yadav | H04L 43/04 |
| 10,230,794 B2* | 3/2019 | Tasoulas | H04L 67/1095 |
| 10,326,830 B1 | 6/2019 | Singh | H04L 41/0826 |
| 10,572,509 B2* | 2/2020 | Song | G06F 16/275 |
| 10,581,734 B2* | 3/2020 | Tripathi | H04L 47/783 |
| 10,659,362 B1 | 5/2020 | Sellappa | H04L 45/7457 |
| 2002/0184368 A1 | 12/2002 | Wang | |
| 2003/0056001 A1 | 3/2003 | Mate et al. | |
| 2003/0058880 A1* | 3/2003 | Sarkinen | H04L 45/00 370/413 |
| 2003/0097405 A1 | 5/2003 | Laux et al. | |
| 2004/0004941 A1 | 1/2004 | Malan et al. | |
| 2004/0258062 A1 | 12/2004 | Narvaez | |
| 2004/0264472 A1* | 12/2004 | Oliver | H04L 47/10 370/395.4 |
| 2004/0264481 A1 | 12/2004 | Darling et al. | |
| 2004/0267920 A1 | 12/2004 | Hydrie et al. | |
| 2005/0125424 A1 | 6/2005 | Herriott et al. | |
| 2005/0207420 A1 | 9/2005 | Shanklin | |
| 2005/0249199 A1 | 11/2005 | Albert et al. | |
| 2005/0281205 A1 | 12/2005 | Chandwadkar et al. | |
| 2005/0281257 A1 | 12/2005 | Yazaki et al. | |
| 2006/0098573 A1 | 5/2006 | Beer et al. | |
| 2006/0104286 A1 | 5/2006 | Cheriton | |
| 2006/0133371 A1 | 6/2006 | Matoba et al. | |
| 2006/0155875 A1 | 7/2006 | Cheriton | |
| 2006/0227705 A1 | 10/2006 | Chandwadkar et al. | |
| 2007/0165622 A1 | 7/2007 | O'Rourke et al. | |
| 2008/0084880 A1 | 4/2008 | Dharwadkar | |
| 2009/0135722 A1 | 5/2009 | Boers et al. | |
| 2009/0304007 A1 | 12/2009 | Tanaka et al. | |
| 2010/0054117 A1* | 3/2010 | Southworth | H04L 49/3009 370/216 |
| 2011/0055470 A1 | 3/2011 | Portolani | |
| 2011/0110382 A1 | 5/2011 | Jabr et al. | |
| 2011/0116443 A1 | 5/2011 | Yu et al. | |
| 2011/0235508 A1 | 9/2011 | Goel et al. | |
| 2011/0261811 A1 | 10/2011 | Battestille et al. | |
| 2011/0283013 A1 | 11/2011 | Grosser et al. | |
| 2012/0151090 A1* | 6/2012 | Nakashima | H04L 49/557 709/238 |
| 2012/0163164 A1 | 6/2012 | Terry et al. | |
| 2012/0163180 A1 | 6/2012 | Goel | |
| 2012/0188891 A1 | 7/2012 | Vaelimaa et al. | |
| 2012/0201135 A1 | 8/2012 | Ding et al. | |
| 2012/0210416 A1* | 8/2012 | Mihelich | H04L 63/0218 726/11 |
| 2012/0246637 A1 | 9/2012 | Kreeger et al. | |
| 2012/0303809 A1 | 11/2012 | Patel et al. | |
| 2013/0044636 A1 | 2/2013 | Koponen et al. | |
| 2013/0201989 A1 | 8/2013 | Hu et al. | |
| 2013/0215754 A1* | 8/2013 | Tripathi | H04L 69/22 370/236 |
| 2013/0223438 A1* | 8/2013 | Tripathi | H04L 69/22 370/355 |
| 2013/0235868 A1 | 9/2013 | Owens et al. | |
| 2013/0235870 A1* | 9/2013 | Tripathi | H04L 41/5019 370/390 |
| 2013/0238885 A1* | 9/2013 | Tripathi | H04L 47/6205 713/2 |
| 2013/0242983 A1* | 9/2013 | Tripathi | H04L 47/10 370/355 |
| 2013/0272305 A1 | 10/2013 | Lefebvre et al. | |
| 2013/0343408 A1 | 12/2013 | Cook et al. | |
| 2014/0006535 A1 | 1/2014 | Reddy | |
| 2014/0019602 A1 | 1/2014 | Murthy et al. | |
| 2014/0025986 A1 | 1/2014 | Kalyanaraman et al. | |
| 2014/0075108 A1 | 3/2014 | Dong et al. | |
| 2014/0092901 A1* | 4/2014 | Kapadia | H04L 49/356 370/390 |
| 2014/0140212 A1* | 5/2014 | Morandin | H04L 49/505 370/235 |
| 2014/0153573 A1* | 6/2014 | Ramesh | H04L 45/748 370/392 |
| 2014/0233564 A1 | 8/2014 | Lue et al. | |
| 2014/0258485 A1* | 9/2014 | Yang | H04L 45/02 709/223 |
| 2014/0282611 A1 | 9/2014 | Campbell et al. | |
| 2014/0307553 A1 | 10/2014 | Fung | |
| 2014/0307580 A1 | 10/2014 | Fung | |
| 2014/0321462 A1 | 10/2014 | Kancherla et al. | |
| 2014/0372567 A1 | 12/2014 | Ganesh et al. | |
| 2014/0376373 A1* | 12/2014 | Deshpande | H04L 47/12 370/235 |
| 2015/0006749 A1* | 1/2015 | Hendel | H04L 47/34 709/230 |
| 2015/0043581 A1* | 2/2015 | Devireddy | H04L 49/70 370/392 |
| 2015/0081762 A1 | 3/2015 | Mason et al. | |

(56) References Cited

U.S. PATENT DOCUMENTS

| | | | |
|---|---|---|---|
| 2015/0100725 A1* | 4/2015 | Ganapathy | H04L 41/12 711/114 |
| 2015/0117458 A1 | 4/2015 | Gurkan et al. | |
| 2015/0124833 A1* | 5/2015 | Ma | G06F 9/4881 370/412 |
| 2015/0131663 A1* | 5/2015 | Brar | H04L 45/745 370/392 |
| 2015/0163192 A1* | 6/2015 | Jain | H04L 43/04 370/255 |
| 2015/0207741 A1 | 7/2015 | Luo et al. | |
| 2015/0215819 A1 | 7/2015 | Bosch et al. | |
| 2015/0312134 A1* | 10/2015 | Kapadia | H04L 45/02 370/256 |
| 2015/0312153 A1* | 10/2015 | Venkataswami | H04L 47/125 370/235 |
| 2016/0087887 A1 | 3/2016 | Fung | |
| 2016/0094643 A1 | 3/2016 | Jain et al. | |
| 2016/0164787 A1* | 6/2016 | Roach | H04L 47/125 370/235 |
| 2016/0182378 A1 | 6/2016 | Basavaraja et al. | |
| 2016/0182379 A1 | 6/2016 | Mehra et al. | |
| 2016/0234071 A1* | 8/2016 | Nambiar | H04L 43/08 |
| 2016/0241491 A1* | 8/2016 | Tripathi | H04L 49/1523 |
| 2016/0251607 A1 | 9/2016 | Kloos | |
| 2016/0269295 A1 | 9/2016 | A S et al. | |
| 2016/0315814 A1* | 10/2016 | Thirumurthi | H04L 49/35 |
| 2016/0316005 A1* | 10/2016 | Thirumurthi | H04L 67/101 |
| 2016/0345814 A1 | 10/2016 | Thirumurthi et al. | |
| 2016/0328159 A1 | 11/2016 | Coddington et al. | |
| 2016/0337244 A1 | 11/2016 | Baveja et al. | |
| 2017/0024453 A1* | 1/2017 | Raja | H04L 47/125 |
| 2017/0048146 A1* | 2/2017 | Sane | H04L 47/125 |
| 2017/0085485 A1* | 3/2017 | Vanini | H04L 47/125 |
| 2017/0093670 A1 | 3/2017 | Dinan et al. | |
| 2017/0093723 A1* | 3/2017 | Sane | H04L 47/125 |
| 2017/0163539 A1* | 6/2017 | Sreeramoju | H04L 69/326 |
| 2017/0214654 A1* | 7/2017 | Johnsen | H04L 45/74 |
| 2017/0279690 A1* | 9/2017 | Tripathi | H04L 45/586 |
| 2017/0295099 A1* | 10/2017 | Murphy | H04L 47/125 |
| 2017/0310594 A1* | 10/2017 | Kotha | H04L 45/741 |
| 2017/0324664 A1* | 11/2017 | Xu | H04L 45/245 |
| 2018/0025299 A1* | 1/2018 | Kumar | G02B 6/4292 709/224 |
| 2018/0027312 A1* | 1/2018 | Adiletta | G02B 6/4452 398/45 |
| 2018/0077064 A1* | 3/2018 | Wang | H04L 69/22 |
| 2018/0146030 A1* | 5/2018 | Weng | H04L 67/1023 |
| 2018/0176145 A1* | 6/2018 | Sharma | H04L 47/726 |
| 2018/0262446 A1* | 9/2018 | Zuo | H04L 63/02 |
| 2019/0140956 A1* | 5/2019 | Shen | H04L 45/7453 |

OTHER PUBLICATIONS

Wang, et al., "Load-balancing behind switch fabrics", EE Times, designlines Wireless & Networking, UBM Electronics, A AspenCore company, Sep. 25, 2001, 5 pgs.

Pavlos Parissis, et al., "Distributed load balancing", Real case example using open source on commodity hardware, Booking.com, Oct. 2016, 20 pgs.

* cited by examiner

SWITCH FABRIC BASED LOAD BALANCING

PRIORITY CLAIM

This application claims priority to U.S. Provisional Application No. 62/435,844, filed Dec. 18, 2016.

TECHNICAL FIELD

The present disclosure relates to networking devices, systems and applications.

BACKGROUND

End users have more communications choices than ever before. A number of prominent technological trends are currently afoot (e.g., more computing devices, more online video services, more Internet video traffic), and these trends are changing the network delivery landscape. One of these trends is load balancing.

DESCRIPTION OF EXAMPLE EMBODIMENTS

Overview

Briefly, in one embodiment, a switch/switching fabric is configured to load balance traffic. The switch fabric includes a plurality of switches. A packet is received at a first switch of the plurality of switches. The first switch load balances the packet to a particular entity among a plurality of entities. Each of the entities is connected to one of the plurality of switches. The first switch determines a particular switch of the plurality of switches to which the packet should be directed, the particular entity being connected to the particular switch of the plurality of switches. The particular switch receives the packet, and determines which interface of the particular switch to direct the packet to the particular entity. The plurality of entities include servers and network appliances as physical devices or virtual machines.

Example Embodiments

Pervasive Load Balancing for the Programmable Fabric

There is no load-balancer today that scales for the East-West traffic in a data center switch fabric. Customers have to buy an external load-balancer, which is costly.

In a programmable network (switch) fabric, the servers, the virtual machines (VMs), and the containers (specific to a given service) can be distributed across the fabric, attached to different Top-of-Rack (ToR)/leaf switches. Pervasive Load Balancing (PLB) enables load balancing to the servers that are distributed across the fabric.

On the ToR/leaf switches, PLB involves matching the source IP address bits/mask, the destination IP address (Virtual IP address), and relevant Layer 3/Layer 4 fields to load balance these requests among the servers. If a server become non-responsive or non-operational then it provides resiliency by atomically switching the client traffic from destined non-operational node to configured standby node/s. Traffic assignment is achieved by automatically changing PBR rules to standby node/s.

In PLB, the entire fabric acts as a massive load-balancer. Clients, servers, Layer 4=Layer 7 (L4-L7) appliances can be connected anywhere in the fabric. The fabric could be Virtual Extensible Local Area Networking (VXLAN)/Ethernet Virtual Provide Networking (EVPN)/Border Gateway Protocol (BGP), FabricPath, Dynamic Fabric Automation (DFA) or any other networking/switching fabric technology now known or hereinafter developed.

Figure 1:
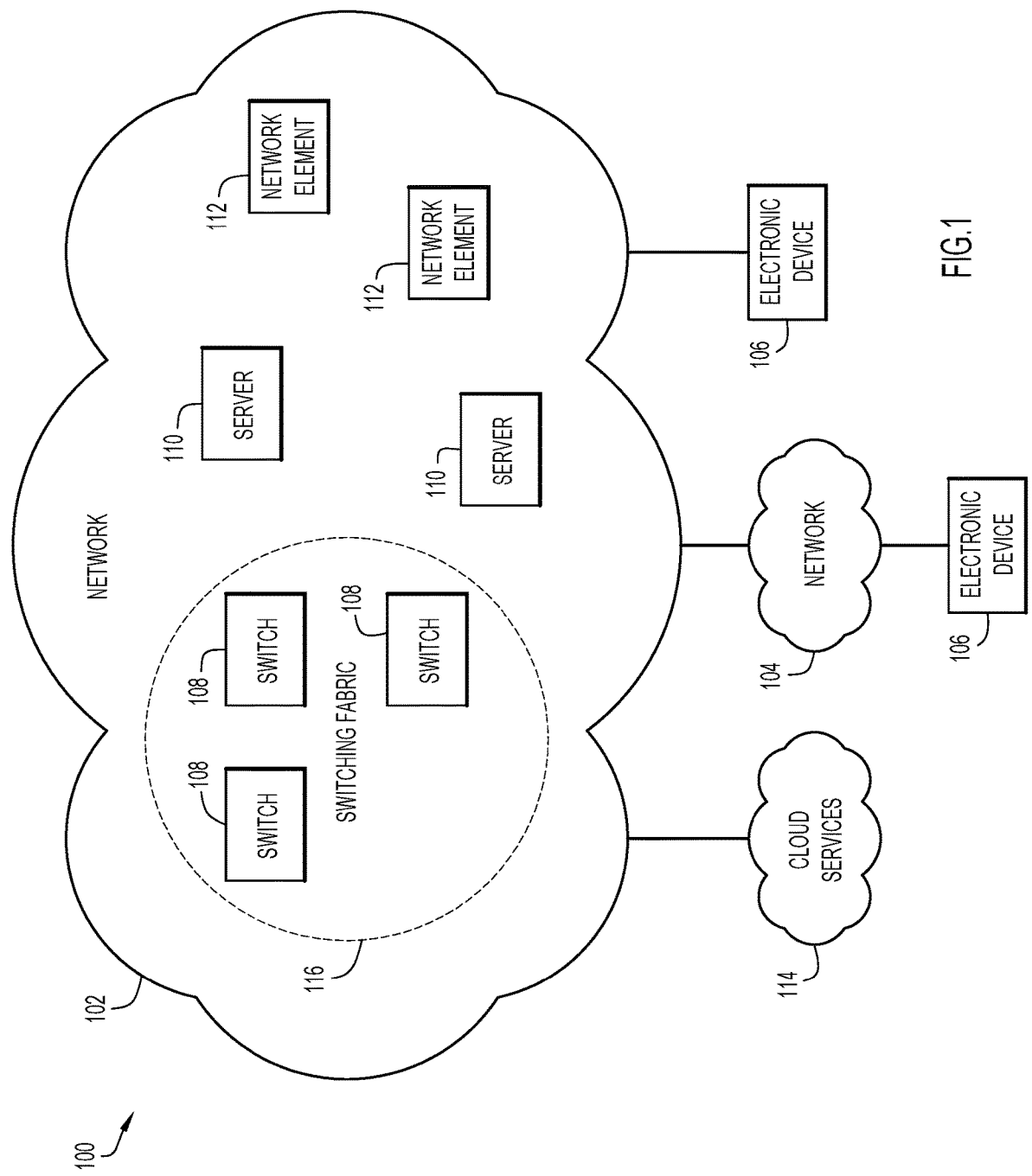
FIG. 1 is high level diagram of a communication system configured to perform switching fabric based load balancing, according to an example embodiment.

Turning to FIG. 1, a simplified block diagram is shown of a communication system 100. Communication system 100 includes a network 102, a secondary network 104, a plurality of electronic devices 106, and cloud services 114. Network 102 includes a plurality of switches 108, a plurality of servers 110, and a plurality of network elements 112.

Communication system 100 can be implemented in any type or topology of networks. Network 102 represents a series of points or nodes of interconnected communication paths for receiving and transmitting packets of information that propagate through communication system 100. Network 102 offers a communicative interface between nodes, and may be configured as any local area network (LAN), virtual local area network (VLAN), wide area network (WAN), wireless local area network (WLAN), metropolitan area network (MAN), Intranet, Extranet, VPN, and any other appropriate architecture or system that facilitates communications in a network environment, or any suitable combination thereof, including wired and/or wireless communication. Network 102 offers a communicative interface between nodes, and may be configured as a LAN, wireless LAN, home area network (HAN), near-me area network (NAN), personal area network (PAN), or some other similar network.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof. Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, switches 108, servers 110, and network elements 112 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, switches 108, servers 110, and network elements 112 are network elements can include memory elements for storing information to be used in the operations outlined herein. Switches 108, servers 110, and network elements 112 are network elements may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as switches 108, servers 110, and network elements 112 are network elements can be configured to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, switches 108, servers 110, and network elements 112 are network elements may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

FIG. 1 also shows a switching fabric 116 that includes a plurality of switches 108 configured to perform the load balancing operations described here.

Figure 2:
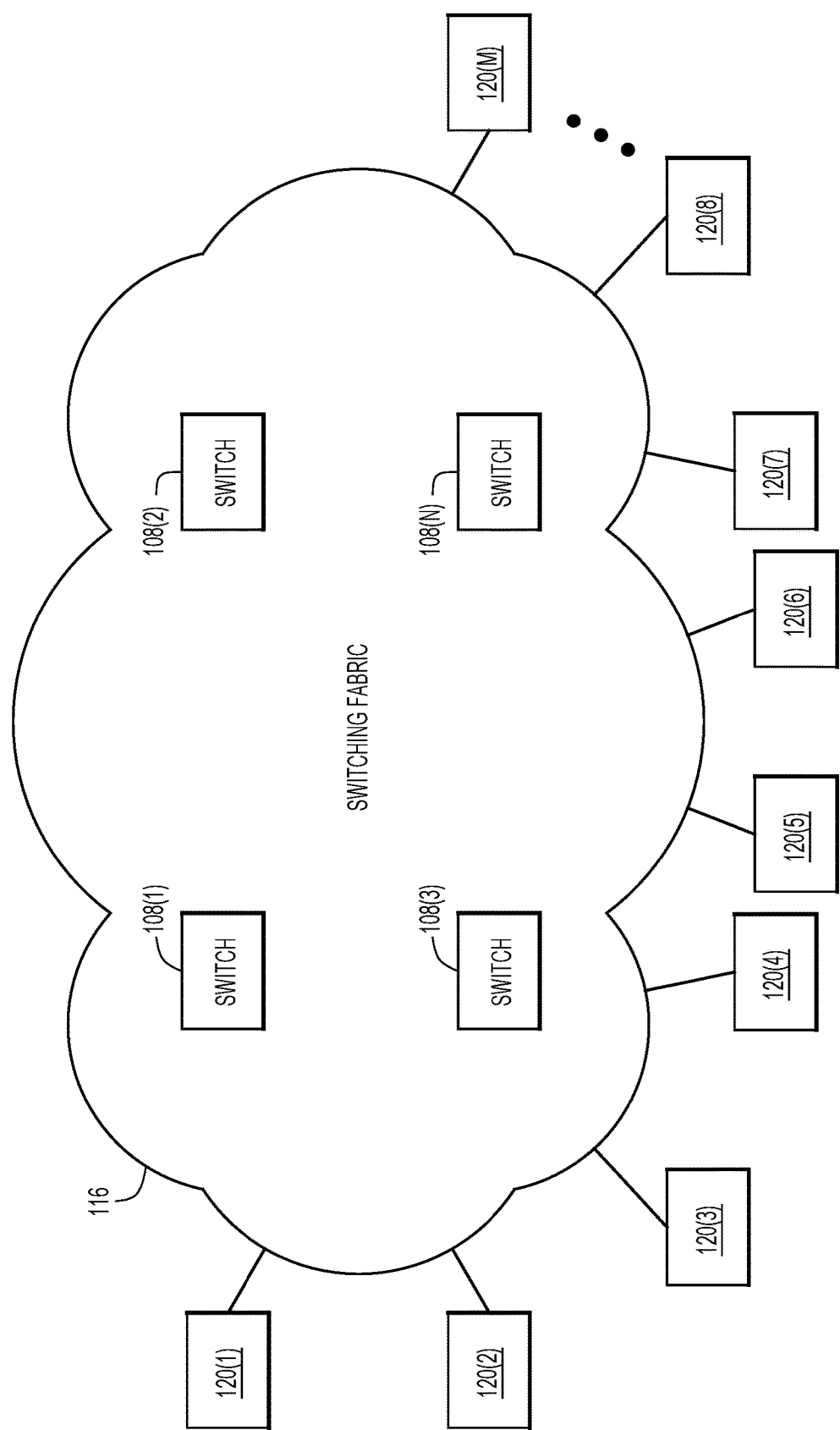
FIG. 2 is a diagram showing a switching fabric configured to perform load balancing according to the techniques presented herein.

Turning to FIG. 2 a simplified diagram is shown of a switching fabric 116. The switching fabric 116 comprises a plurality of switches, e.g., data center class switches, 108(1)-108(N), and connected to the switching fabric 116 are a plurality of nodes 120(1)-120(M), that may be clients, servers, and L4-L7 appliances. Examples of L4-L7 appliances are firewalls (FWs), Intrusion Prevention Systems (IPSs), Intrusion Detection Systems (IDSs), Deep Packet Inspection devices, Denial of Service Detection, Wide Area Application Services (WAAS) devices, any of which may be in the form of physical devices or VMs, etc. Switching fabric 116 can be configured to allow for analytics and telemetry for massive data from all switches across the fabric and can include bidirectional coherency irrespective of different hardware and even in failure scenarios. Switching fabric 116 may include networking index (VNI) based load balancing (LB) and inner packet based LB. Also, data may be load balanced across VNIs. Switching fabric 116 can also apply pervasive load balancing on VXLAN interfaces. As will become apparent hereinafter, each entry point switch in the fabric 116 can act as a load balancer. In addition, PLB analytics may be performed to expand/shrink the services and VMs based on need.

In an example of switching fabric 116, a pervasive load balancing can be applied to the paths between clients, servers, L4-L7 services. There may be a number of clients (local and across a border leaf), database servers, application servers, web servers, firewalls, WAAS devices, IPS devices, IDS devices, video caches, etc. Pervasive load balancing can help determine how much traffic is going to device from each device and when the traffic goes high and low. This allows switching fabric 116 to be a truly elastic data center and based on the analytics and telemetry, provide details about when/how to grow the capacity of servers and network appliances.

In addition, the system can be configured to provide recommendations about where to instantiate/remove VMs, containers, network appliances, etc., based on the analytics and telemetry. Also, the system can provide information about the bottlenecks, provide information about when is good time to do system maintenance, such as upgrade software, when to charge more service fees to the tenants, etc.

Figure 3:
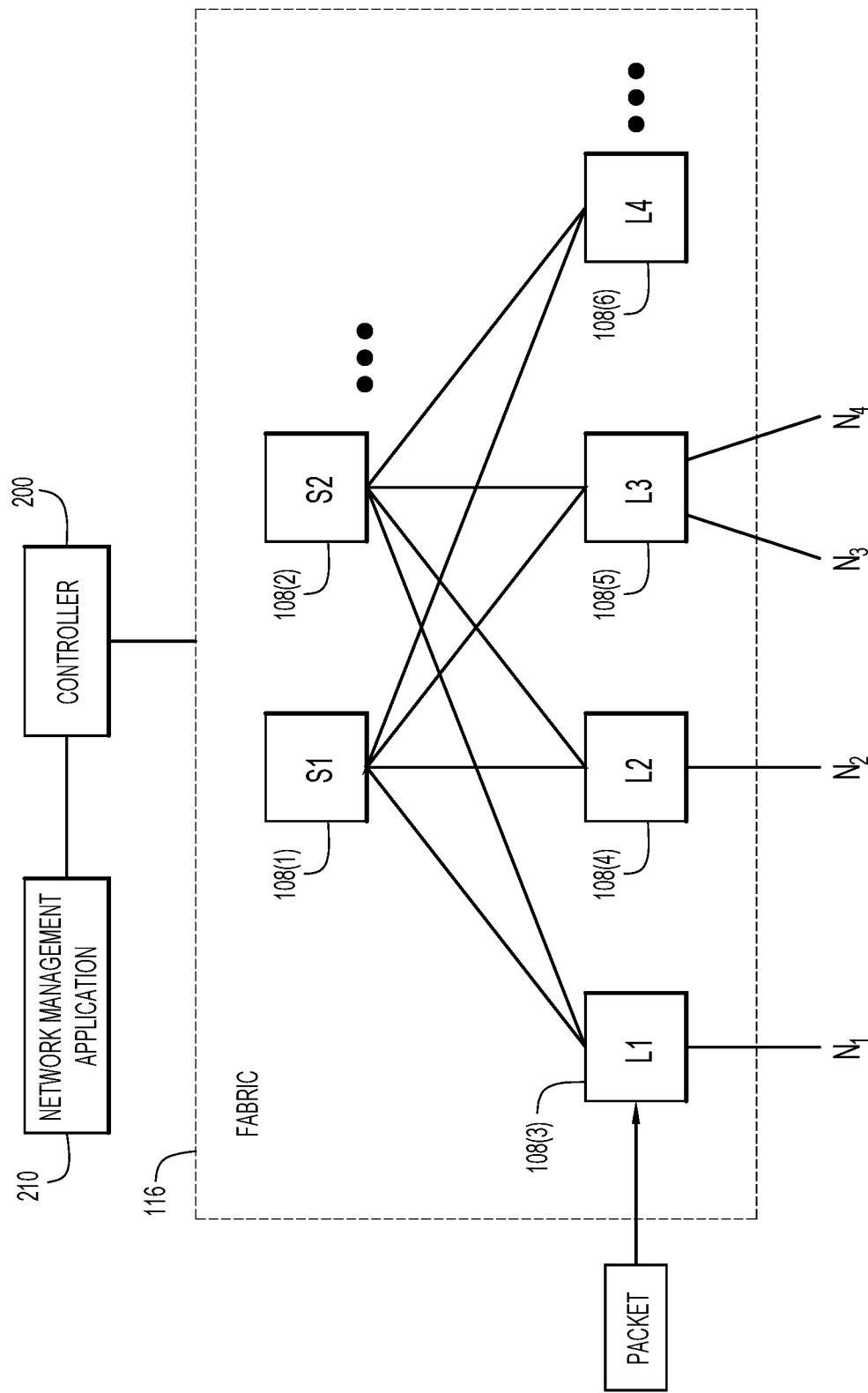
FIG. 3 is a diagram of a system including a switching fabric having a leaf-spine architecture and configured to perform load balancing, according to an example embodiment.

Reference is now made to FIG. 3. FIG. 3 illustrates an example switching fabric 116 that is a VXLAN fabric, which in this example, includes spine switches S1 and S2 shown at reference numerals 108(1) and 108(2), and leaf switches L1-L4 shown at reference numerals 108(3)-108(6). This is a simplified example, and it should be understood that there may be more spine switches and more leaf switches in a typical network deployment. In a spine-leaf switch architecture as shown in FIG. 3, each spine switch is connected to each leaf switch.

FIG. 3 also shows a network controller 200 connected to the switching fabric 116 (and in communication with each of the switches in the switching fabric 116) and a network management application 210 that either is remote from the controller 200 or resides with the controller 200. The controller 200 is responsive to user interface commands provided via the network management application 210, or via a command line interface (CLI), to supply configurations to the switches in the switching fabric 116.

There are nodes $N_1$-$N_4$ connected to certain ones of the switches L1-L4. In particular, node $N_1$ is connected to switch L1, node $N_2$ is connected to switch L2, and nodes $N_3$ and $N_4$ are connected to switch L3. Again, nodes may be a client, server, or L4-L7 network appliance.

According to PLB, the leaf switches in switch fabric 116 are configured to load balance East-West traffic, that is, traffic coming in to the fabric at one of the switches, e.g., a packet entering the fabric at switch L1, to a node connected to that same switch or any other switch in the fabric. The challenges in such fabric-based load balancing is to determine to which node to load balance the traffic, and to determine where the node is connected in the fabric. For example, the packet entering the fabric at switch L1 as shown in FIG. 3, is to be load balanced to node $N_3$. Switch L1 needs to know that the packet meets certain conditions that it is to be load balanced to node $N_3$ and needs to know where $N_3$ is connected in the fabric, in other words, that $N_3$ is connected to switch L3. The controller 200 configures the switches L1-L4 with appropriate information that enables the switches of the switching fabric to cooperate to load balance traffic accordingly.

Figure 4:
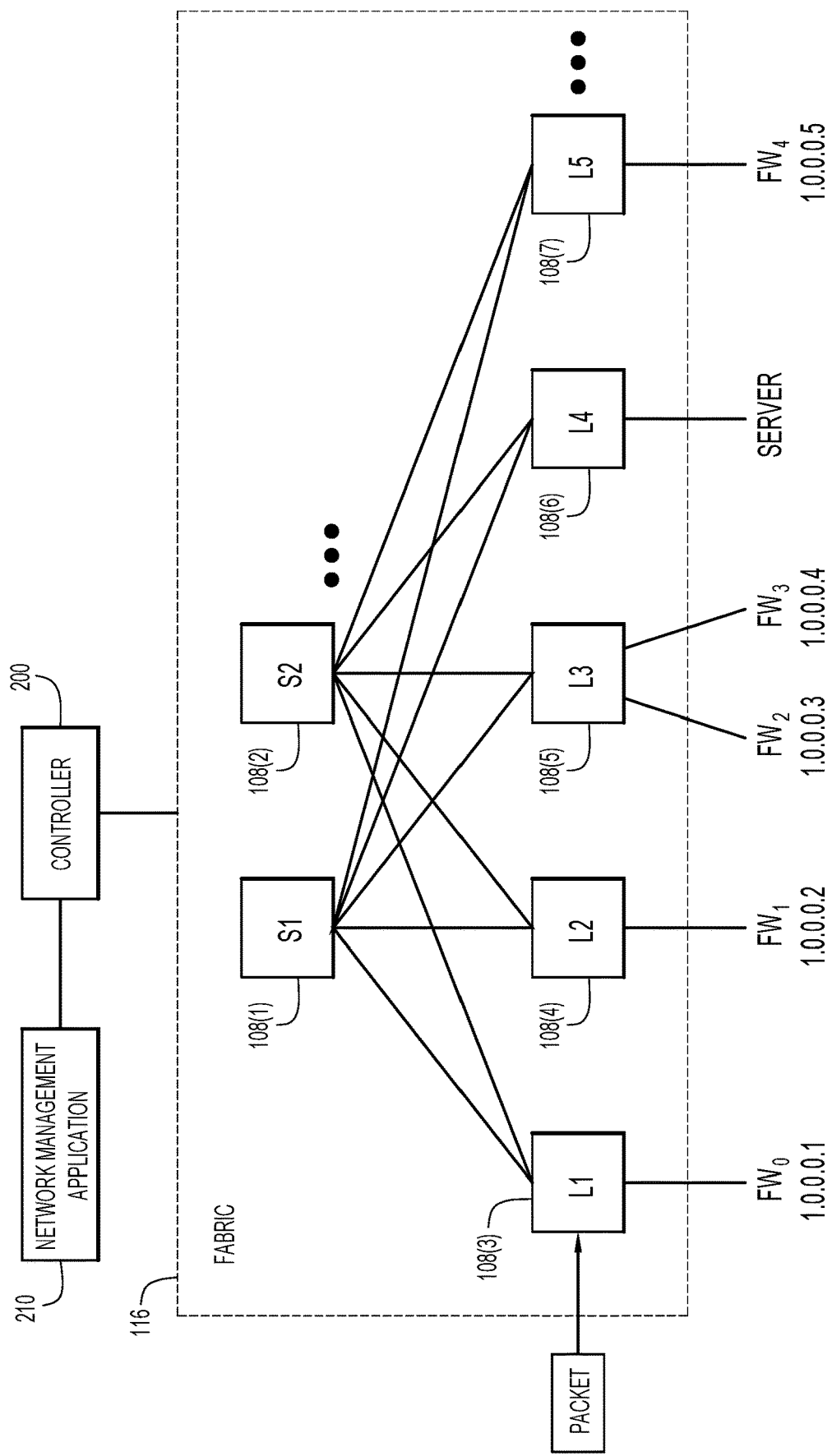
FIG. 4 is a diagram of a system including a switch fabric having a leaf-spine architecture and configured to load balance traffic to firewalls, according to an example embodiment.

FIG. 4 illustrates another example of a switching fabric 116, similar to FIG. 3, but in a specific example where the nodes include firewalls $FW_0$-$FW_4$ connected to leaf switches L1-L5 shown at reference numerals 108(3)-108(7). Each of the spine switches 108(1) and 108(2) is connected to each of the leaf switches 108(3)-108(7). In this example, firewall $FW_0$ is reachable at IP address 1.0.0.0.1, $FW_1$ is reachable at 1.0.0.0.2, $FW_2$ is reachable at 1.0.0.0.3, $FW_3$ is reachable at 1.0.0.0.4, and $FW_4$ is reachable at 1.0.0.0.5. When traffic enters the fabric, e.g., at switch L1, depending on attributes of the traffic, switch L1 will direct the packet to the appropriate leaf switch (even to itself) in order to load balance the packet to a particular firewall among the firewalls $FW_0$-$FW_4$. The packet will travel to the appropriate leaf switch via one of the spine switches S1 and S2. FIG. 4 illustrates the additional challenge for load balancing in a fabric. Traffic needs to be sent from a source, e.g., a client to a destination, e.g., a server, while load balancing to a set of firewalls.

As an example, when the source address (or destination address) of the packet entering the fabric falls within a particular range, all of the switches are configured (in an ingress configuration mode) to recognize that the address is within the particular range, in order to direct the packet to the leaf switch to which a particular firewall is connected. Moreover, the leaf switch that receives the packet is configured to direct the packet to the particular interface to which that particular firewall is connected.

In another example implementation, traffic is to be sent from A to B and from B to A. A and B may be a client and a server, respectively. The switch fabric 116 load balances traffic from A to Firewalls ($FW_0$-$FW_4$). Traffic from A is received at a first switch, e.g., switch L1. Switch L1 load balances to $FW_1$ by directing the traffic to switch L2, to FW1, and after that to B (B may be connected to any switch in the fabric.) Similarly, traffic from B is received at switch L2 which load balances to $FW_1$ and then switch L2 directs the traffic (post-$FW_1$) to switch L1 (via a spine switch), and ultimately to A. If the $FW_1$ goes down, both switch L1 and switch L2 remove $FW_1$ from load-balancing so that pervasive load balancing on all switches is dynamically synchronized. Different types of load balancing employed by the system can include, but is not limited to, Non-Direct Server Return (DSR) Server Load Balancing (SLB), Wide Area Application Services/Web Cache Communication Protocol (WAAS/WCCP) insertion, firewall cluster load balancing, DSR SLB, client and server/FW on different subnets, Client and server/FW on the same subnet, and/or firewall non-cluster load balancing.

Figure 5:
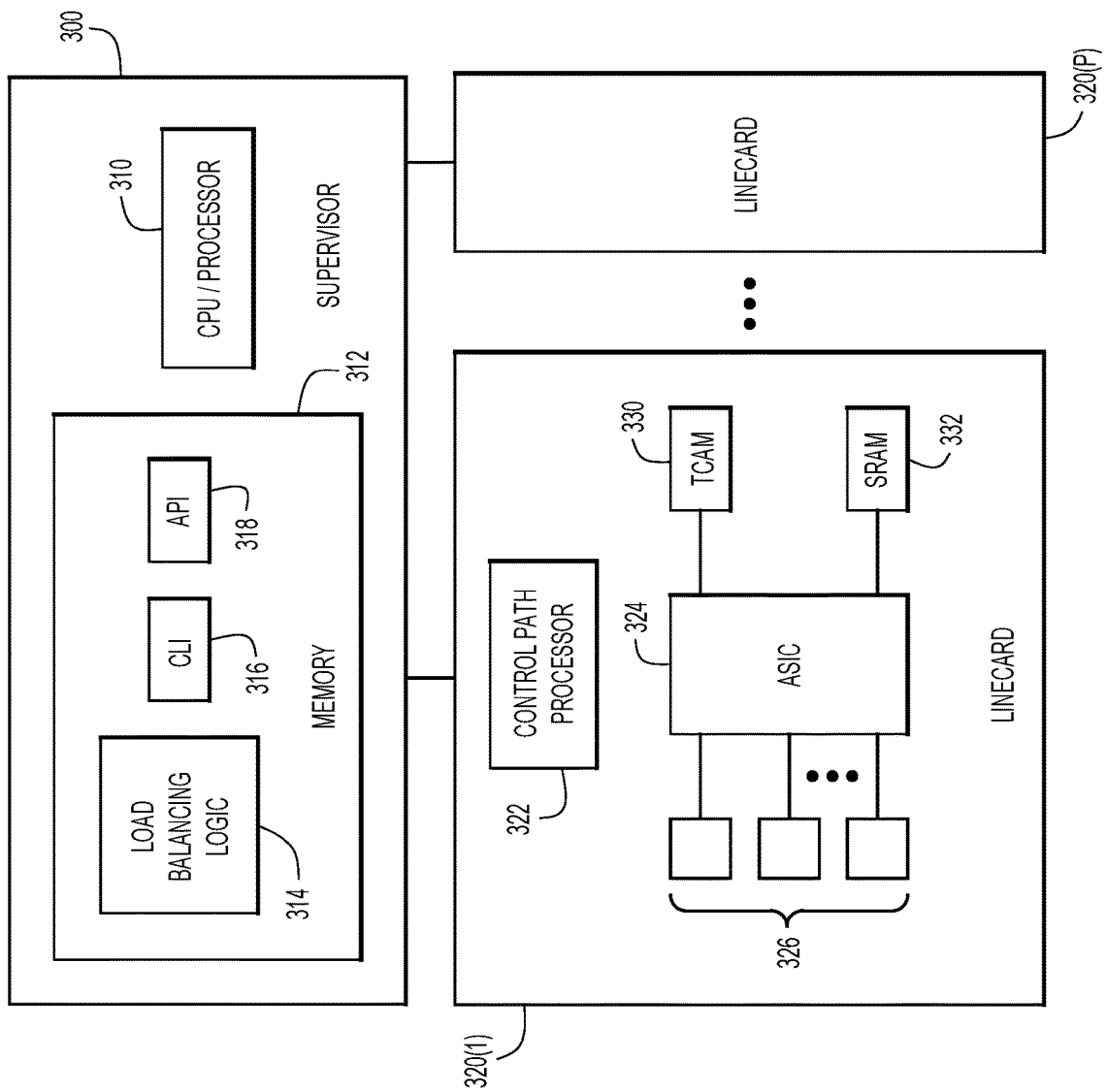
FIG. 5 is a block diagram of a switch that is part of the switching fabric and configured to load balance traffic, according to an example embodiment.

FIG. 5 is a block diagram of a switch configured to participate in the load balancing techniques described herein. The switch shown in FIG. 5 is labeled 108(*i*) to indicate that it represents any of the switches shown in FIGS. 1-4. In one embodiment, the switch 108(i) includes a supervisor module or section 300 and a plurality of linecards 320(1)-320(P). The supervisor module 300 includes a central processing unit or processor 310 and memory 312. The memory 312 stores software instructions that are executed by the processor 310. In particular, the memory 312 stores instructions for load balancing logic 314, a CLI 316 to receive CLI commands and also an Application Programming Interface (API) 318 to receive API commands, e.g., from a controller or network management application (as shown in FIGS. 3 and 4). The load balancing logic 314 works with the CLI 316 or API 318 to convert configurations received therefrom to appropriate configurations for the linecards 320(1)-320(P).

Each linecard includes a control path processor 322, an ASIC 324, a plurality of ports/interfaces 326 coupled to the ASIC 324, a Ternary Content-Addressable Memory (TCAM) 330 and a Static Random Access Memory (SRAM) 332. The control path processor 322 is a CPU/processor that receives configuration commands from the supervisor 300 to program the TCAM 330 and SRAM 332. The ASIC 324 is a hardware device that directs an incoming packet at a port/interface 326 to a particular other port/interface 326 based on the content of the TCAM 330 and SRAM 332. There may be multiple TCAM/SRAM pairs in a linecard.

Figure 6:
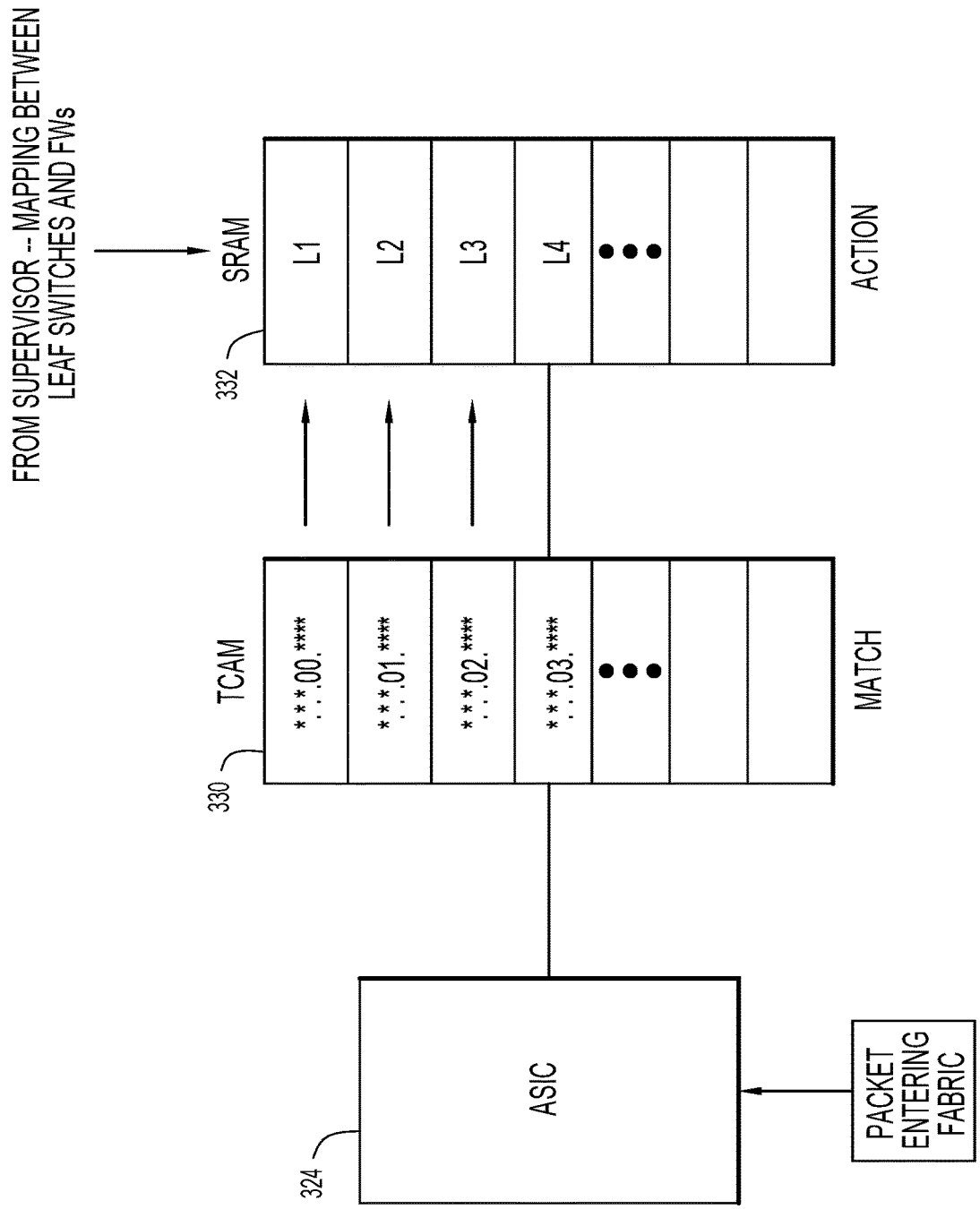
FIG. 6 is a diagram showing hardware memory components of a switch configured to perform load balancing operations on ingress traffic to the switching fabric, according to an example embodiment.

Reference is now made to FIG. 6. FIG. 6 shows, in more detail, the TCAM 330 and SRAM 332, and how they are configured to perform the load balancing techniques. More specifically, FIG. 6 shows how a switch is configured for ingress switch behavior, that is, for handling directing of packets where the packet enters the fabric (to where the packet is to be load balanced in the fabric). The TCAM 330 stores data that describes attributes of a packet to which a match is to be made, and the SRAM stores the data that describes the action to be taken when a corresponding match occurs in the SRAM. For example, if a source IP address (or destination IP address, etc.) of a packet falls within a range indicated by "*.*.*.00.****" (where "*" is indicates a wildcard), in the first entry of the TCAM 330, then the action to be taken, is to direct that packet to leaf switch L1 in the first entry of the SRAM 332. Similarly, when the source IP address (or destination address, etc.) of a packet falls within a range indicated by "*.*.*.01.****" in the second entry of the TCAM 330, then the action to be taken is to direct the packet to leaf L2. The load balancing function is achieved by the supervisor module of the switch (in response to externally provided commands) configuring the entries stored in the TCAM 330 and SRAM 332 to achieve the desired directing of packets to particular leaf switches where certain network appliances are connected, such as firewalls. Thus, the supervisor module maintains a mapping between leaf switches and the network appliances connected to the respective leaf switches. In other words, in the example of FIG. 4, in order to direct traffic matching "*.*.*.00.****" to $FW_0$, the ingress behavior of the switches need to be configured as shown in FIG. 6. A similar configuration is needed to direct traffic matching "*.*.*.01.****" to $FW_1$ in FIG. 4, and so on.

Figure 7:
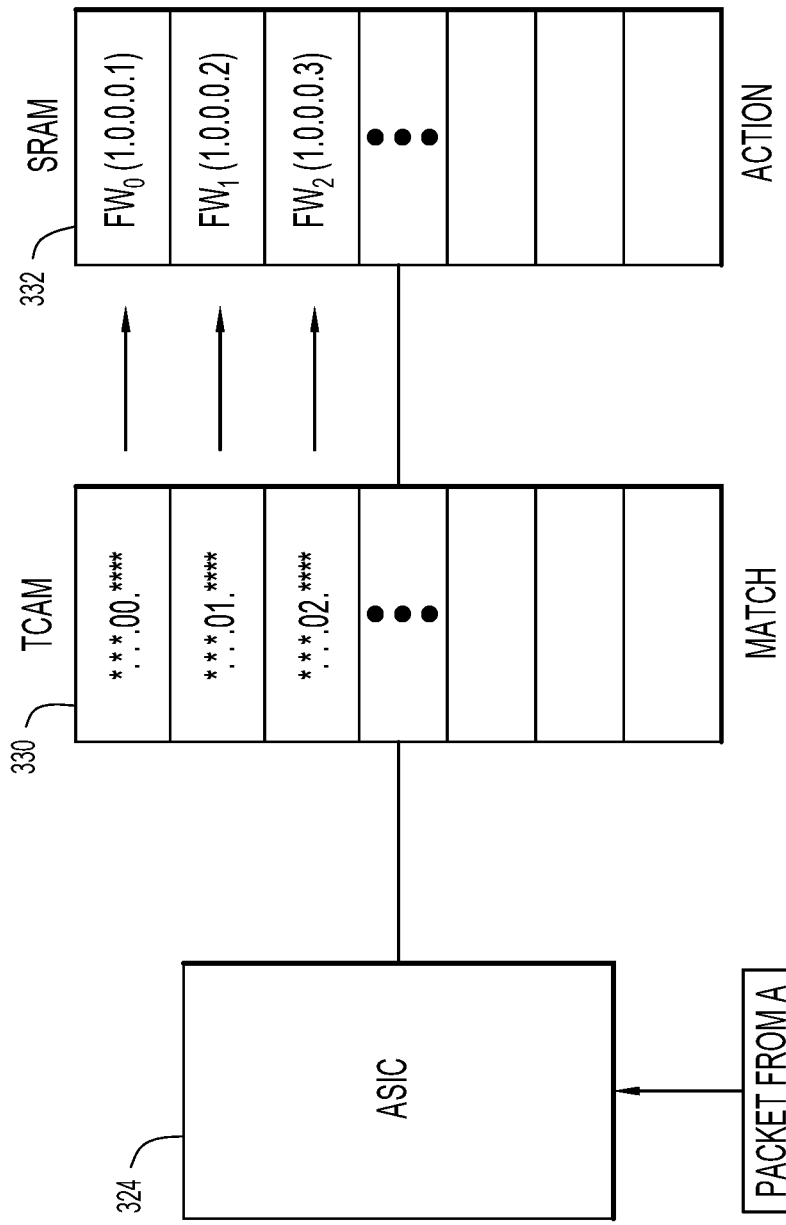
FIG. 7 is a diagram showing hardware memory components of a switch configured to perform load balancing operations on egress traffic from the switching fabric, according to an example embodiment.

FIG. 7 illustrates how a switch is configured for egress switch behavior by which a packet is directed to a leaf switch where the packet leaves the fabric, i.e., to go to a particular network appliance connected to the fabric. Thus, in egress switch behavior, the packet that is received by the ASIC 324 of the leaf switch is from a spine switch in the fabric as shown in FIGS. 3 and 4. The egress switch behavior, for purposes of load balancing, involves configuring the TCAM 330 and SRAM 332 in order to direct the packet to the appropriate network appliance. That network appliance need not be connected to that particular switch. Thus, if traffic matching "*.*.*.00.****" in the first entry of the TCAM 330 is to be load balanced to $FW_0$ in the example of FIG. 4, then the first entry in the SRAM 332 is populated with the address of $FW_0$, 1.0.0.0.1. Likewise, if traffic matching "*.*.*.01.****" is to be load balanced to FW1, then the corresponding SRAM entry is populated with the address of $FW_1$, 1.0.0.0.2.

The TCAM 330 and the SRAM 332 can be populated with entries such that they over-specify the traffic handling (for egress behavior). For example, all but the first entries in the TCAM 330 and SRAM 332 will be invoked, but that does not affect how packets are directed. Packets will still be load balanced/directed appropriately.

The configuration/orchestration functions may be via the network management application 210 and controller 200 (FIGS. 3 and 4), whereby the controller 200 supplies the appropriate commands to all the supervisor modules 300 (FIG. 5) of the switches to configure the appropriate operations for PLB. Alternatively, each switch may be manually configured via the network management application 210 for the appropriate operations for PLB.

Figure 8:
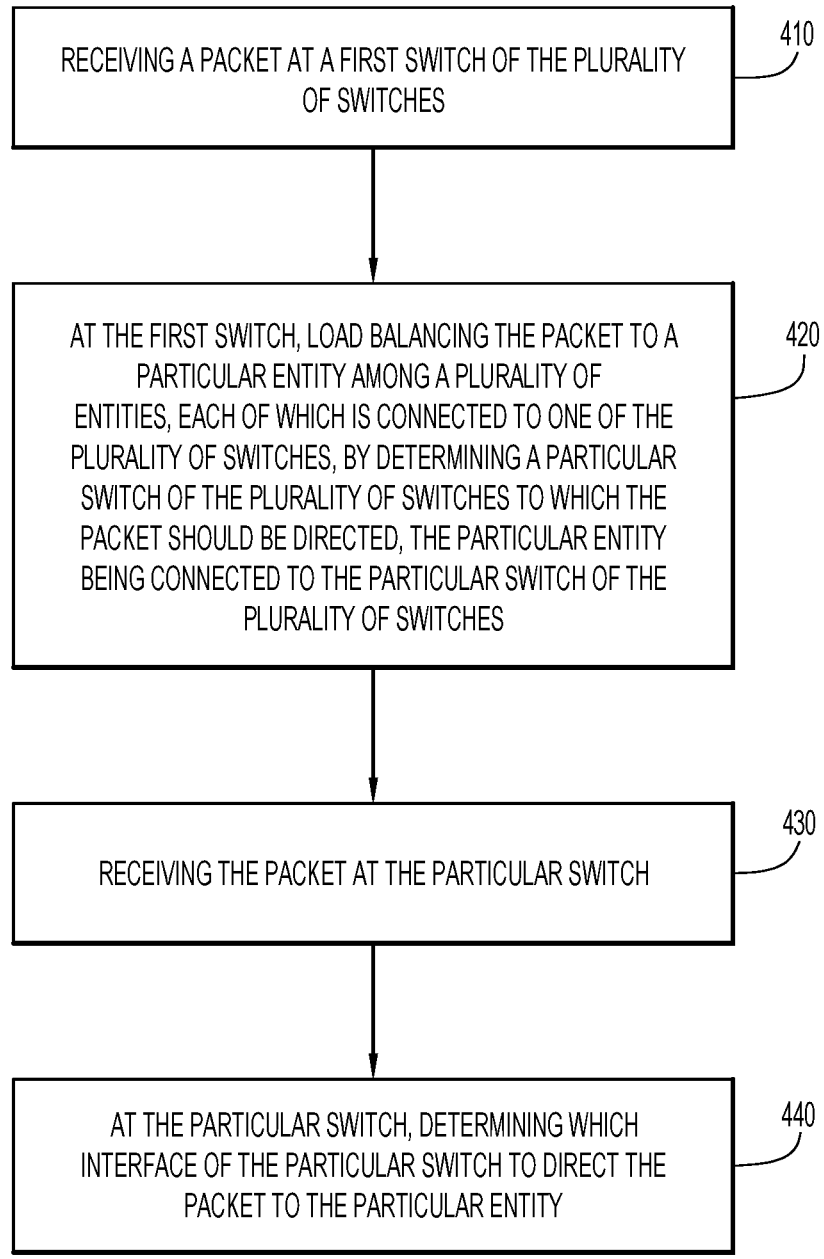
FIG. 8 is a flow chart depicting operations performed by switches in the switching fabric to load balance traffic, according to an example embodiment.

Reference is now made to FIG. 8. FIG. 8 illustrates a flow chart depicting operations of a method 400 by which switches in a switch fabric cooperate to perform switch fabric based load balancing. The method is performed in a switch fabric that includes a plurality of switches. At 510, a first switch of the plurality of switches receives a packet. The packet may be part of a traffic flow. At 420, the first switch load balances the packet to a particular entity among a plurality of entities. Each entity is connected to one of the plurality of switches. The first switch load balances by determining a particular switch of the plurality of switches to which the packet should be directed. The particular entity is connected to the particular switch of the plurality of switches. At 430, the particular switch receives the packet. At 440, the particular switch determines which (port) interface of the particular switch to direct the packet to the particular network appliance, and so directs the packet to that interface so that it is received by the particular entity.

As explained above in connection with FIGS. 6 and 7, the particular switch and the first switch may be the same switch, or the particular switch and the first switch may be different switches of the plurality of switches.

As described above in connection with FIG. 6, the determining operation of the load balancing step at 420 in FIG. 8 may include first examining a first memory (e.g., a TCAM) which stores entries for one or more attributes of match criteria associated with ingress traffic received by the first switch to determine whether an attribute of the packet matches any entry of the first memory; and second examining a second memory (e.g., an SRAM) which store entries describing networking actions to be performed for each corresponding entry of the first memory, wherein each entry of the second memory includes an identifier of one of the plurality of switches to which a packet received by the first switch is to be directed.

The one or more attributes of match criteria stored in each entry of the first memory of the first switch includes one of: an address range for a source address of the packet or an address range for a destination address of the packet.

Similarly, as described above in connection with FIG. 7, the determining operation 440 in FIG. 8 may include first examining a first memory (e.g., a TCAM) of the particular switch which stores entries for attributes of match criteria associated with traffic received by the particular switch to determine whether an attribute of the packet matches any entry of the first memory; and second examining a second memory (e.g., an SRAMC) of the particular switch which store entries describing networking actions to be performed for each corresponding entry of the first memory, wherein each entry of the second memory includes an identifier of an interface of the particular switch to which a packet received by the particular switch is to be directed so that the packet is sent to the particular entity.

The one or more attributes of match criteria stored in each entry of the first memory of the particular switch includes one of: an address range for a source address of the packet or an address range for a destination address of the packet.

As shown in FIGS. 3 and 4, the plurality of switches may include leaf switches and spine switches such that each of the leaf switches is connected to each of the spine switches, and wherein ingress traffic to the switch fabric is received at one of the leaf switches and egress traffic from the switch fabric is sent via one of the leaf switches, and traffic sent internally in the switch fabric between leaf switches flows through at least one of the spine switches, and the plurality of entities are connected to leaf switches.

Furthermore, as described above, the switch fabric acts as a massive load-balancer, and the plurality of entities include clients, servers and Layer 4-Layer 7 network appliances that are physical devices or virtual machines that may be connected anywhere in the switch fabric.

Turning to FIGS. 9-18, various deployment examples of the load balancing techniques are now described. The system can be configured for pervasive load balancing. At each leaf, load balancing can be done on each switch. Each leaf can act as a load balancer by itself to enable the entire fabric to act as a load balancer.

Figure 9:
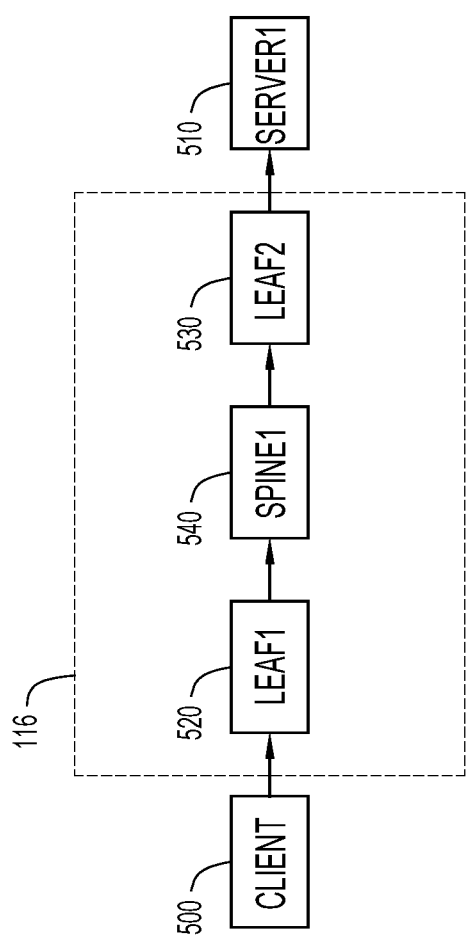
FIG. 9 is a simplified diagram of a non-Direct Server Return Server Load Balancing (non-DSR SLB) deployment that employs the switching fabric load balancing techniques, according to an example embodiment.

Referring to FIG. 9, a non-DSR SLB deployment example is shown. In this example, traffic from a client 500 is to be sent to a server 510 through switch fabric 116 having a spine-leaf architecture and which includes two leaf switches 520 and 530 and a spine switch 540. In this example, the client 500 and server 510 may be on different subnets. Leaf switch 520 may act as the router Switched Virtual Interface (SVI). An SVI is a virtual LAN (VLAN) of switch ports represented by one interface to a routing or bridging system. There is no physical interface for the VLAN and the SVI provides the Layer 3 processing for packets from all switch ports associated with the VLAN. Leaf switch 520 load balances to a plurality of servers that includes server 520. Leaf switch 520 rewrites the destination IP address of traffic to be load balanced to server 510 from a virtual IP (VIP) address, associated with a particular tenant traffic flow, to the IP address of server 510.

Figure 10:
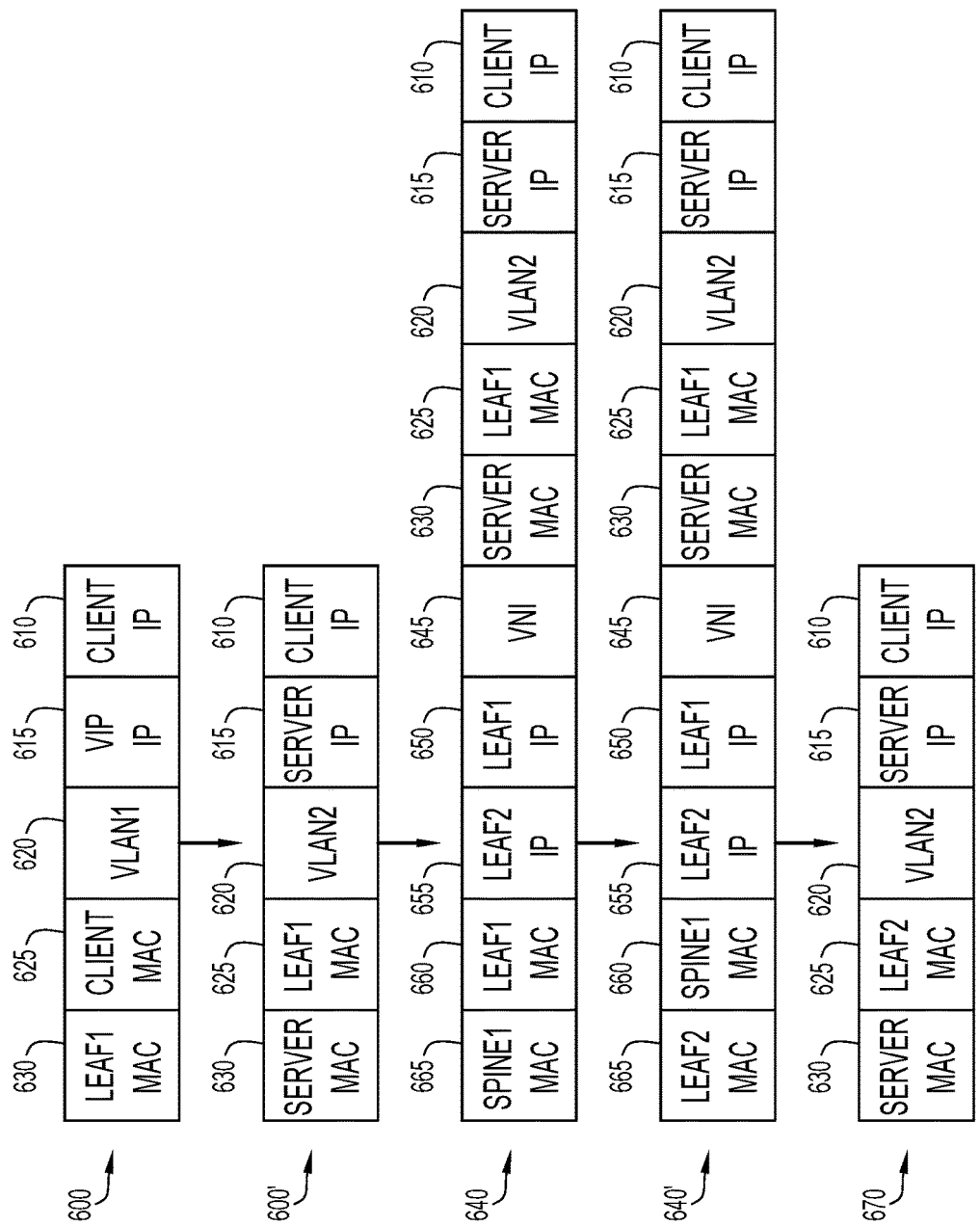
FIG. 10 illustrates the packet encapsulations for packet flows from a client to a server in the example deployment shown in FIG. 9.
Figure 11:
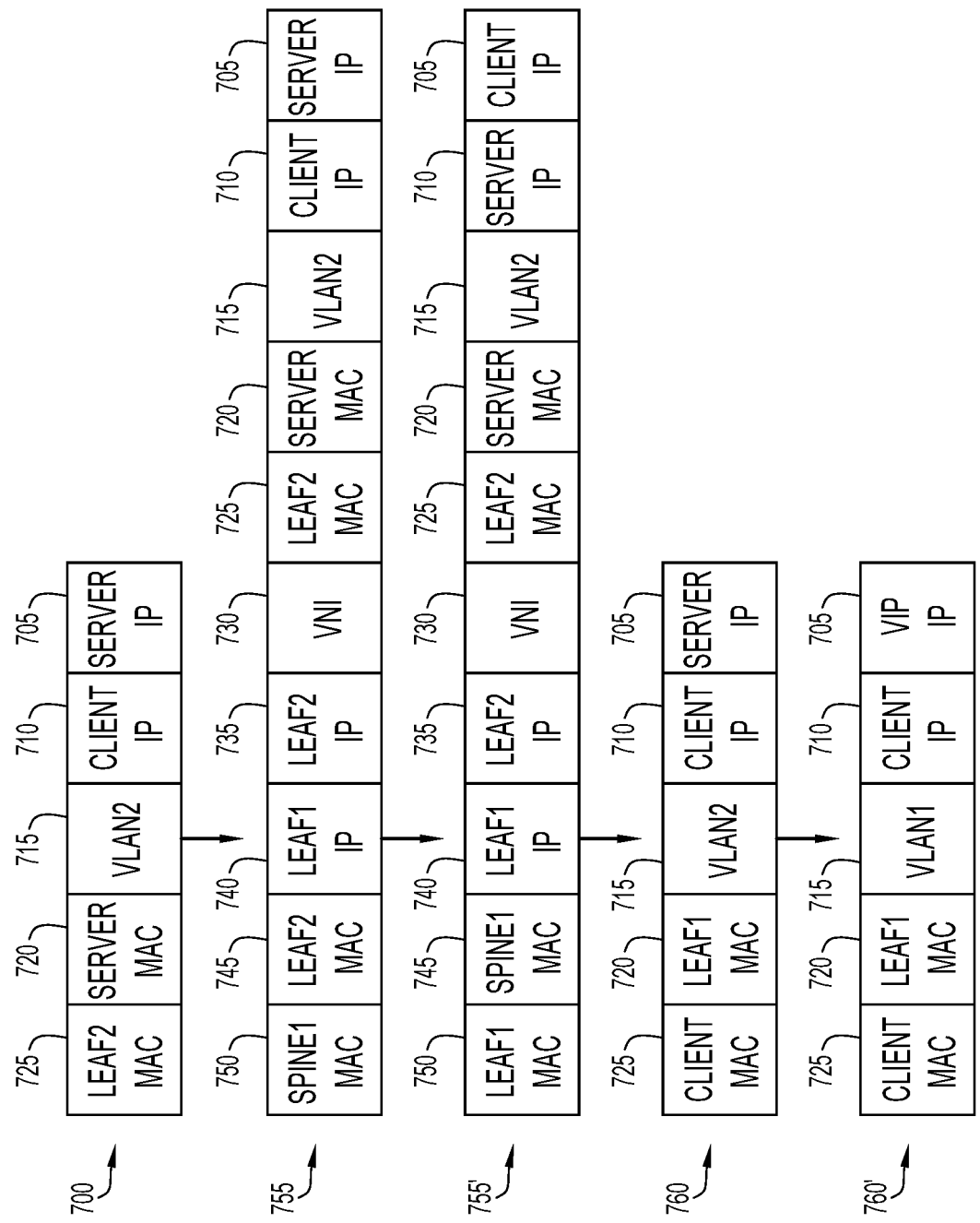
FIG. 11 illustrates the packet encapsulations for packet flows from the server to the client in the example deployment shown in FIG. 9.

FIGS. 10 and 11 illustrate the packet encapsulations for the forward and reverse flow of the deployment example of FIG. 9. Referring first to FIG. 10, the packet flow in the forward direction from the client to leaf switch 520 to server 510 is described. The packet sent from the client is shown at 600, and includes a source IP address field 610 that is client's IP address, a VIP address as the destination IP address 615 used by the client to identify its traffic in the network, a VLAN field 620 (specifying VLAN1), a source Media Access Control (MAC) address field 625 filled with the client's MAC address and a destination MAC address field 630 filled with the MAC address of leaf switch 520.

When the leaf switch 520 receives the packet 600, it rewrites the destination IP address field 615 that contains the VIP address, with the IP address of server 510. The leaf switch 520 also inserts in the VLAN field 620 the identifier for VLAN2 (for the server's VLAN), and inserts in the source MAC address field 625 the MAC address of leaf switch 520 and in the destination MAC address field the MAC address of the server, thereby forming packet 600'.

Next, leaf switch 520 forms the encapsulated packet 640 that it sends to the spine switch 540. The encapsulated packet 640 includes all of the fields of packet 600', plus a virtual network identifier (VNI) field 645, a source IP address field 650 containing the IP address of leaf switch 520, a destination IP address field 655 containing the IP address of leaf switch 530, a source MAC address field 660 containing the MAC address of leaf switch 520 and a destination MAC address field 665 containing the destination MAC address of spine switch 540. Leaf switch 520 sends packet 640 to spine switch 540.

Spine switch 540 receives packet 640. Spine switch 540 forms a packet 640' that includes all the same fields as packet 640 except that the source MAC address field 660 is populated with the MAC address of the spine switch 540, and the destination MAC address field 665 is populated with the MAC address of the leaf switch 530. The spine switch 540 sends packet 640' to the leaf switch 530.

When the leaf switch 530 receives packet 640', it decapsulates the packet and strips off the fields 645, 650, 655, 660 and 665. Leaf switch 530 then inserts in the destination IP address field 635 the IP address of the server, inserts in the VLAN field 620 the VLAN identifier (VLAN2) for the VLAN of which the server is a part, inserts in the source MAC address field 625 the MAC address of leaf switch 530 and inserts in the destination MAC address field 630 the MAC address of the server 510. The resulting packet is shown at 670 and the leaf switch 530 sends it to the server 510.

FIG. 11 shows the packet flow in the reverse direction. The packet sent by the server 510 is shown at 700, and includes a source IP address field 705 populated with the server's IP address, a destination IP address field 710 populated with the client's IP address, a VLAN identifier field 715 populated with the VLAN identifier (VLAN2) for the VLAN in which the server resides, a source MAC address field 720 containing the server's MAC address and a destination MAC address 725 containing the MAC address of leaf switch 530.

When the packet 700 reaches leaf switch 530, leaf switch 530 encapsulates packet 700 so that it is directed to the spine switch 540. Specifically, leaf switch 530 adds the VNI field 730, source IP address field 735 containing the IP address for leaf switch 530, destination IP address field 740 containing the IP address for leaf switch 520, source MAC address field 745 containing the MAC address for leaf switch 530 and destination MAC address field 750 containing the MAC address for spine switch 540. The resulting encapsulated packet is shown at 755. The leaf switch 530 sends packet 755 to the spine switch 540.

When the spine switch 540 receives packet 755, it replaces the MAC address of the leaf switch 520 in source MAC address field 745 with the MAC address of the spine switch 540 and replaces the MAC address of the spine switch in the destination MAC address field 750 with the MAC address of leaf switch 520. Spine switch 540 then sends packet 755' to leaf switch 520.

When leaf switch 520 receives packet 755', it decapsulates packet 755' removing fields 730, 735, 740, 745 and 750. Then, the leaf switch 520 fills in the source MAC address field 720 with the MAC address of leaf switch 520 and fills the destination MAC address field 725 with the MAC address of the client, producing packet 760. Then, before sending it to the client, the leaf switch replaces the source IP address field 705 with the VIP address of the server, and inserts the VLAN identifier (VLAN1) where the client resides, in VLAN field 715. The leaf switch 520 sends the resulting packet 760' sent to the client.

Figure 12:
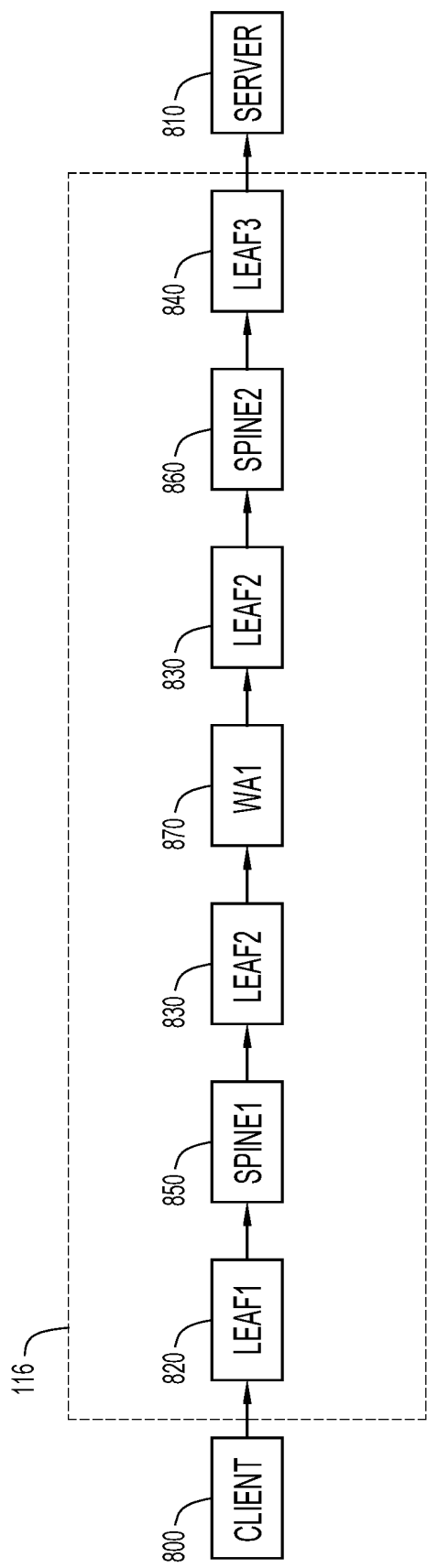
FIG. 12 is simplified diagram of a Wide Area Application Services/Web Cache Communication Protocol (WAAS/WCCP) insertion, according to an example embodiment.

FIG. 12 illustrates another deployment scenario that involves WAAS/WCCP insertion. In this example, a client 800 is sending traffic to a server 810 via fabric 116. The switch fabric 116 includes leaf switches 820, 830 and 840 and spine switches 850 and 860. There is a WAAS appliance (WA1) 870 connected to leaf switch 830. In this example, leaf switch 820 is doing the router/SVI functions, and is doing the load-balancing to a plurality of WAAS appliances, of which WAAS appliance 870 is one. For simplicity, it is assumed that WAAS appliance 870 is on the same subnet as leaf switch 820. WAAS appliance 870 rewrites the source IP when sending a packet to the server 820. In most situations, the client 800 is in the Internet and the server 810 is in a data center. In this example, there is no network address translation being performed.

Figure 13A:
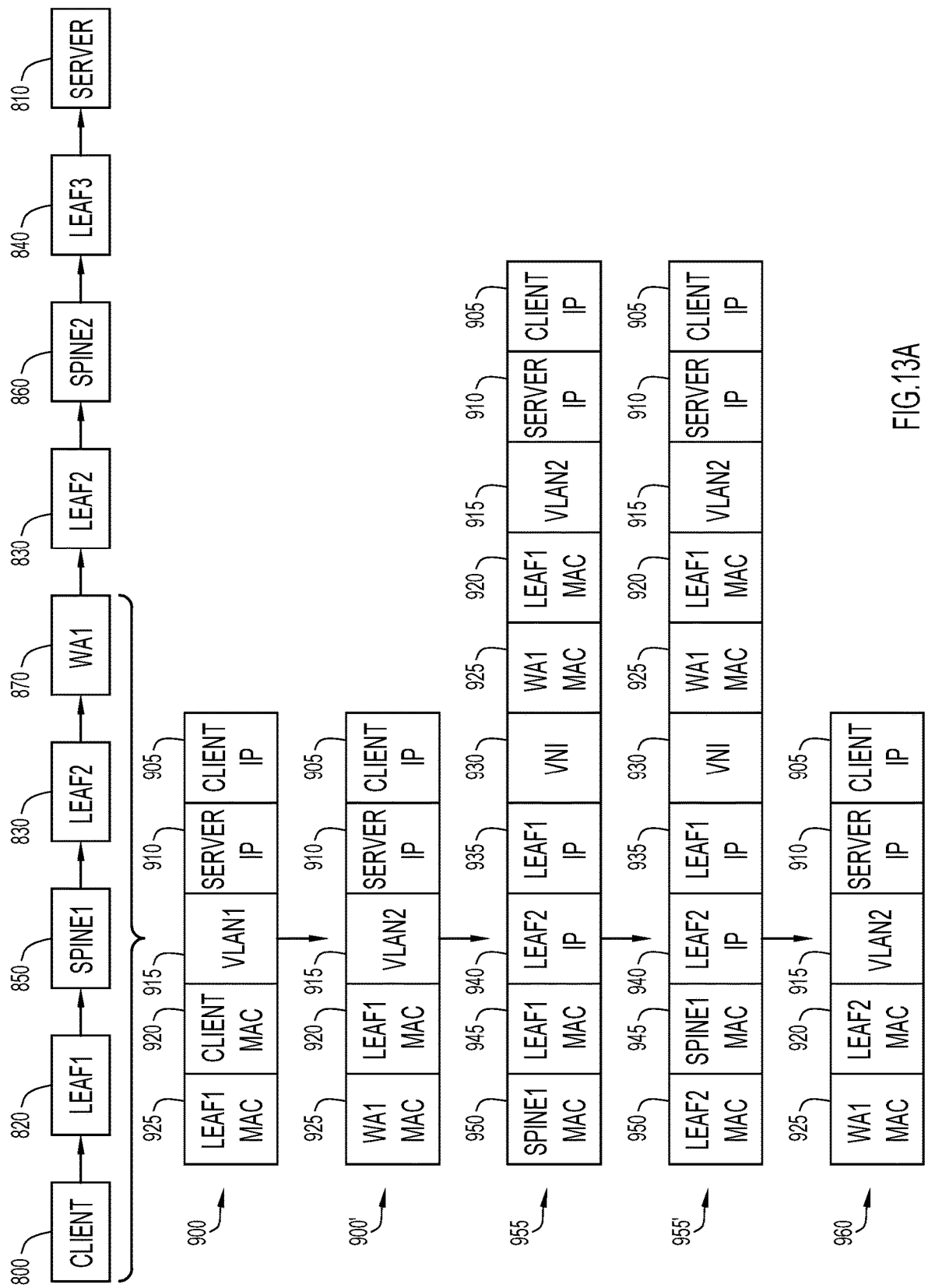
FIGS. 13A and 13B illustrate the packet encapsulations for packet flows from a client to a server for the example deployment shown in FIG. 12.
Figure 13B:
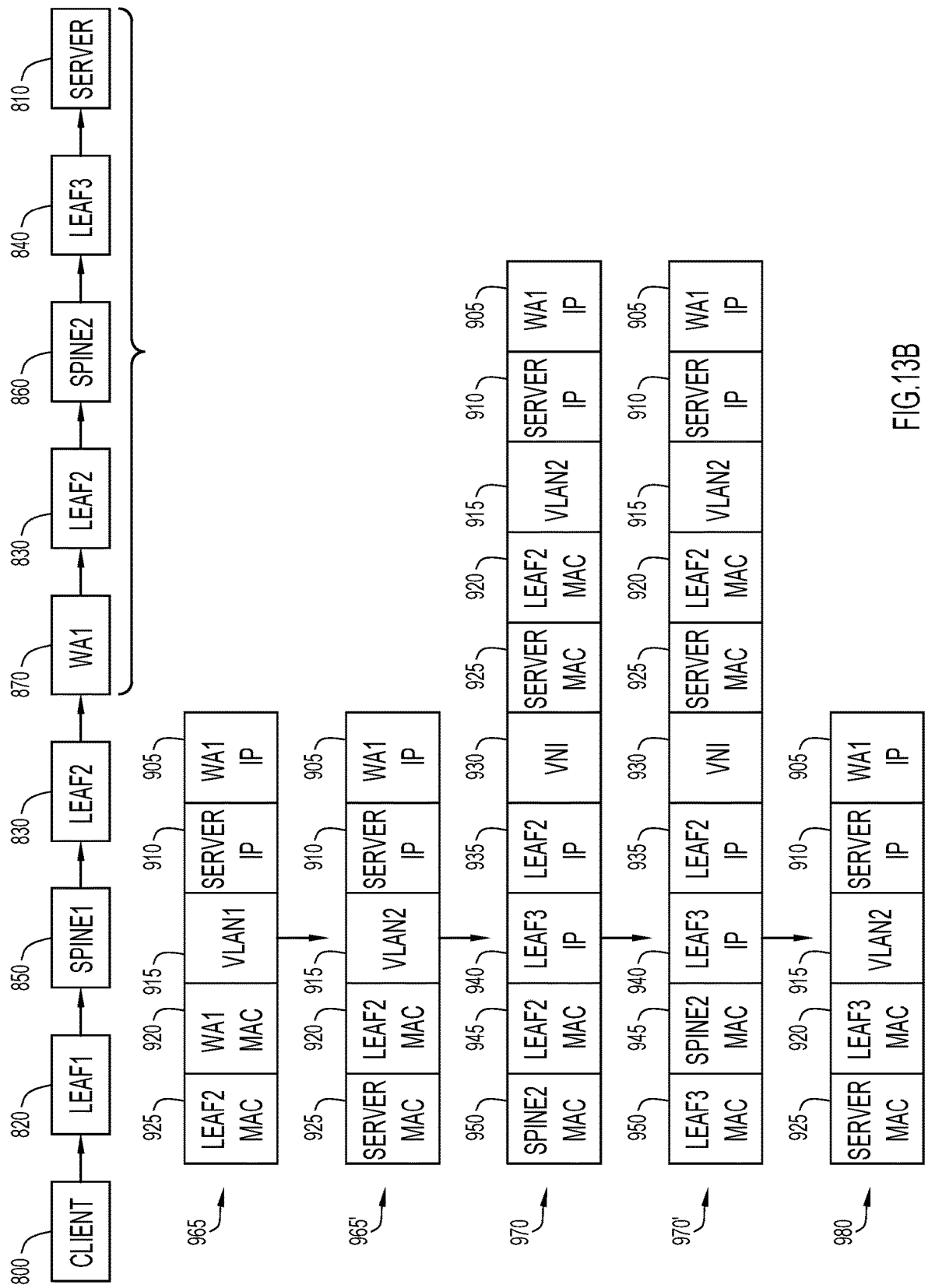

FIGS. 13A and 13B show two parts of the packet flow from the client 800 to the server 810. FIG. 13A shows the packet flow from client 800 to WAAS appliance 870. FIG. 13B shows the packet flow from WAAS appliance 870 to server 810.

Referring first to FIG. 13A, the packet sent by the client 800 is shown at 900. The packet 900 includes a source IP address field 905 filled with the client IP address, a destination IP address field 910 filled with the server IP address, a VLAN field 915 filled with VLAN1 for the VLAN in which the client resides, a source MAC address field 920 filled with the client MAC address and a destination MAC address field 925 filled with MAC address of leaf switch 820. Client 800 sends the packet 900 to the leaf switch 820.

Leaf switch 820 receives the packet 900, and inserts the VLAN identifier VLAN2 into field 910, the MAC address for leaf switch 820 into source MAC address field 920 and the destination MAC address of WAAS appliance 870 into destination MAC address field 925. Thus, leaf switch 820 forms packet 900'.

Next, leaf switch 820 encapsulates packet 900' with a VNI field 930, source IP address field 935 containing IP address of leaf switch 820, destination IP address field 940 containing IP address of leaf switch 830, source MAC address field 945 containing MAC address of leaf 820 and destination MAC address field 950 containing MAC address of spine switch 850. The resulting encapsulated packet is shown at reference numeral 955. Leaf switch 820 sends packet 955 to spine switch 850.

When spine switch 850 receives the packet 955, it forms packet 955' by inserting the MAC address of the spine switch 850 into the source MAC address field 945 and inserting the MAC address of leaf switch 830 into the destination MAC address field 950. Spine switch 850 sends packet 955' to leaf switch 830.

When leaf switch 830 receives packet 955', it strips off the fields 930, 935, 940, 945 and 950 from packet 955', and inserts in source MAC address field 920 the source MAC address of leaf switch 830. The leaf switch 830 sends the resulting packet 960 to the WAAS appliance 870.

Reference is now made to FIG. 13B to describe the remainder of the path to the server 810, after the packet has reached the WAAS appliance 870. WAAS appliance 870 forms a packet 965 by inserting into the source IP address field 905 the IP address of the WAAS appliance 870, the IP address of the server in the destination IP address field 910, VLAN identifier VLAN1 in the VLAN field 915, the source MAC address of the WAAS appliance 870 in the source MAC address field 920 and the destination MAC address of the leaf switch 830 in the destination MAC address field 925. The WAAS appliance 870 sends packet 965 to the leaf switch 830.

Leaf switch 830 receives packet 965 and forms packet 965' by inserting the MAC address of the leaf switch 830 into the source MAC address field 920 and the MAC address of the server into the destination MAC address field 925. Also, leaf switch 830 inserts the VLAN identifier for server 810 (VLAN2) in the VLAN field 915.

Leaf switch 830 then encapsulates packet 965' to form packet 970 by inserting VNI field 930, IP address of leaf switch 830 in the source IP address field 935, IP address of leaf switch 840 in the destination IP address field 940, MAC address of leaf switch 830 in the source MAC address field 945 and MAC address of spine switch 950 in the destination MAC address field 950. Leaf switch 830 sends packet 970 to spine switch 860.

After spine switch 860 receives packet 970, it forms packet 970' by inserting MAC address of spine switch 860 into the source MAC address field 945 and MAC address of leaf switch 840 in the destination MAC address field 950. Spine switch 860 sends packet 970' to leaf switch 840.

Leaf switch 840 receives packet 970', and forms packet 980 by stripping off fields 930, 935, 940, 945 and 950 and inserting the MAC address of leaf switch 840 into the source MAC address field 920. Leaf switch 840 sends packet 980 to the server 810.

Figure 14:
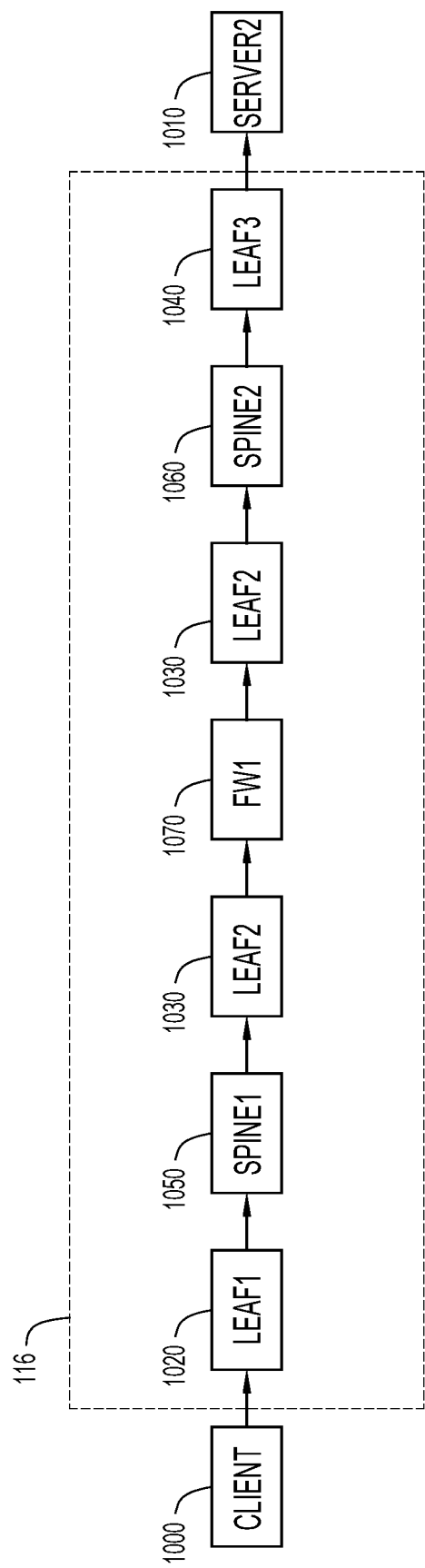
FIG. 14 is a simplified diagram showing firewall cluster load balancing, according to an example embodiment.

Reference is now made to FIG. 14 for a description of yet another example deployment scenario, and in particular firewall cluster load balancing. In this example, a client 1000 is sending traffic to a second server 1010 via a switch fabric 116. Switch fabric 116 includes leaf switches 1020, 1030 and 1040, and spine switches 1050 and 1060. In addition, there is a cluster of firewalls connected to the switch fabric 116, of which a first firewall (FW1) is shown at 1070. In this example, leaf switch 1020 is serving as the router/SVI, and is load balancing to firewall appliances. For simplicity, it is assumed that FW1 is in the same subnet as leaf switch 1020. Moreover, FW1 acts as a router when sending a packet to server 1010. Moreover, there is not IP network address translation done by the switch fabric 116.

Figure 15A:
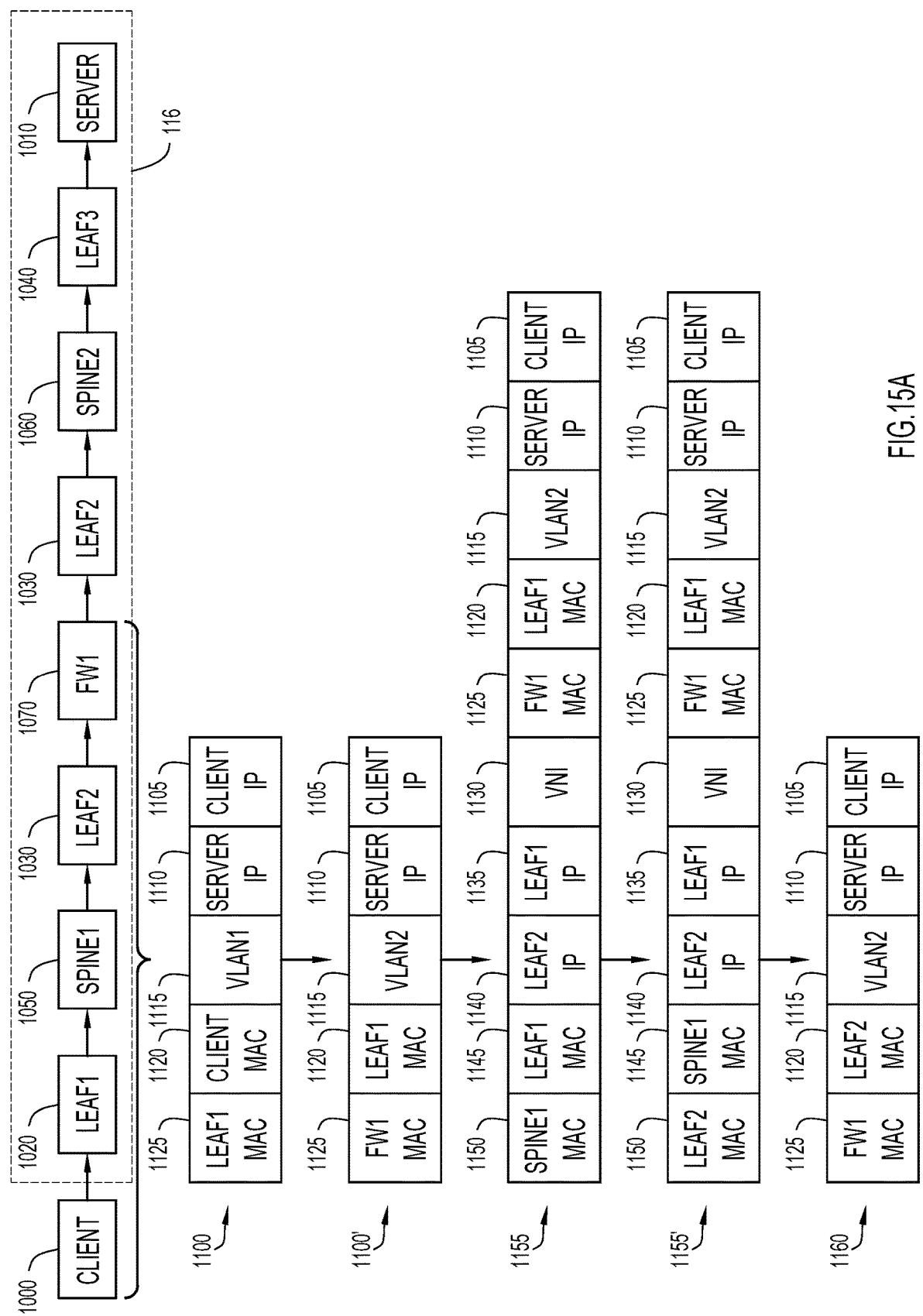
FIGS. 15A and 15B illustrate the packet encapsulations for packet flows from a client to a server for the example deployment shown in FIG. 14.
Figure 15B:
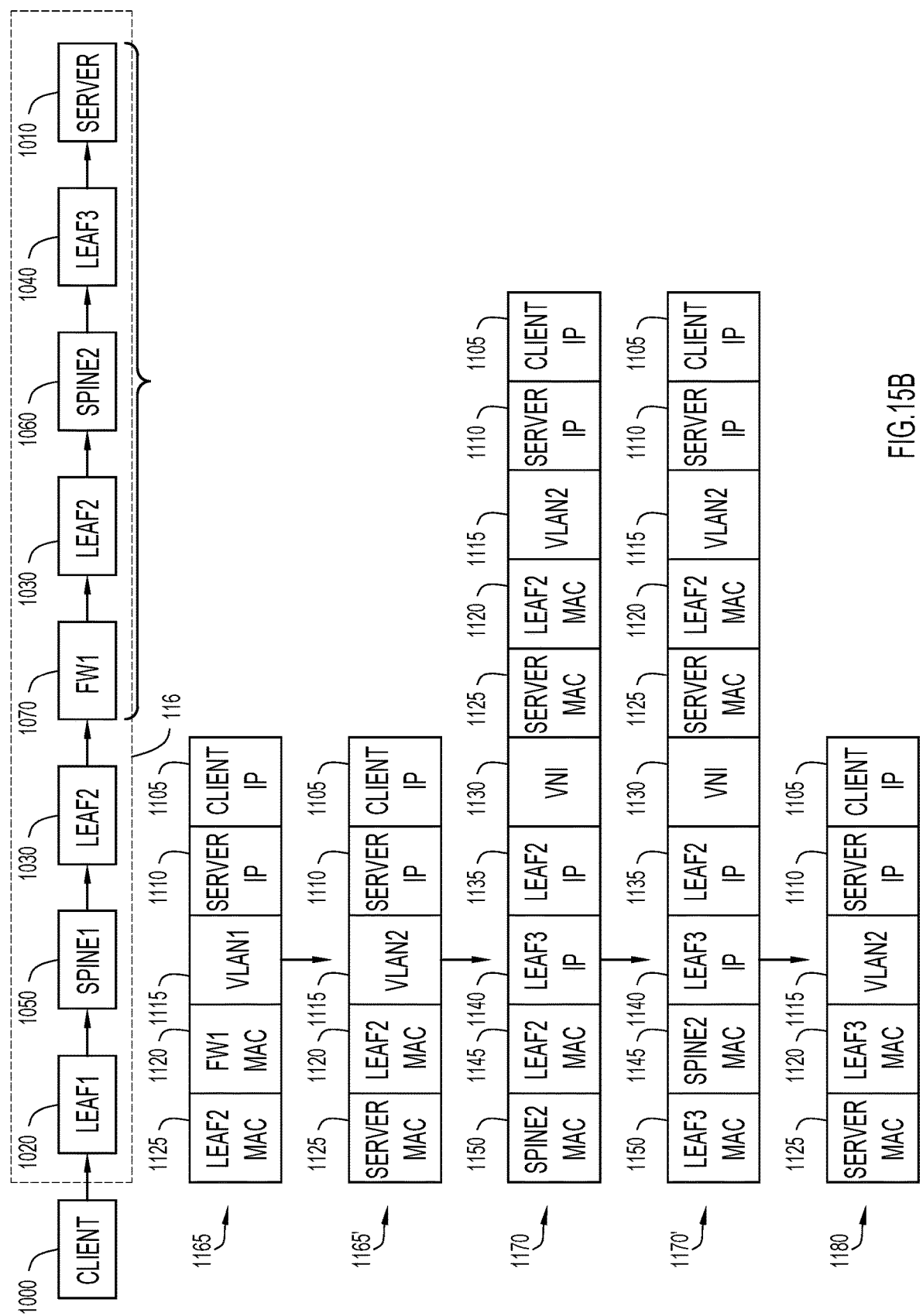

FIGS. 15A and 15B shows parts of the packet flow for the firewall cluster load balancing example of FIG. 14. FIG. 15A shows packet flow from client 1000 to FW1 1070, and FIG. 15B shows the packet flow from FW1 1070 to server 1010.

Referring first to FIG. 15A, client 1000 forms a packet 1100. The packet 1100 includes a source IP address field 1105 filled with the client IP address, a destination IP address field 1110 filled with the server IP address, a VLAN field 1115 filled with VLAN1 for the VLAN in which the client resides, a source MAC address field 1120 filled with the client MAC address and a destination MAC address field 1125 filled with MAC address of leaf switch 1020. Client 1000 sends the packet 1100 to the leaf switch 1020.

Leaf switch 1020 receives the packet 1100, and inserts the VLAN identifier VLAN2 into field 1110, the MAC address for leaf switch 1020 into source MAC address field 1120 and the destination MAC address of FW1 1070 into destination MAC address field 1125. Thus, leaf switch 1020 forms packet 1100'.

Next, leaf switch 1020 encapsulates packet 1100' with a VNI field 1130, source IP address field 1135 containing IP address of leaf switch 1020, destination IP address field 1140 containing IP address of leaf switch 1030, source MAC address field 1145 containing MAC address of leaf 1020 and destination MAC address field 1150 containing MAC address of spine switch 1050. The resulting encapsulated packet is shown at reference numeral 1155. Leaf switch 1020 sends packet 1155 to spine switch 1050.

When spine switch 1050 receives the packet 1155, it forms packet 1155' by inserting the MAC address of the spine switch 1050 into the source MAC address field 1145 and inserting the MAC address of leaf switch 1030 into the destination MAC address field 1150. Spine switch 1050 sends packet 1155' to leaf switch 1030.

When leaf switch 1030 receives packet 1155', it strips off the fields 1130, 1135, 1140, 1145 and 1150 from packet 1155', and inserts in source MAC address field 1120 the source MAC address of leaf switch 1030. The leaf switch 1030 sends the resulting packet 1160 to the FW1 1070.

Reference is now made to FIG. 15B to describe the remainder of the path to the server 1010, after the packet has reached FW1 1070. FW1 1070 forms a packet 1165 by inserting into the source IP address field 1105 the IP address of FW1 1070, the IP address of the server in the destination IP address field 1110, VLAN identifier VLAN1 in the VLAN field 1115, the source MAC address of FW1 1070 in the source MAC address field 1120 and the destination MAC address of the leaf switch 1030 in the destination MAC address field 1125. The FW1 1070 sends packet 1165 to the leaf switch 1030.

Leaf switch 1030 receives packet 1165 and forms packet 1165' by inserting the MAC address of the leaf switch 1030 into the source MAC address field 1120 and the MAC address of the server into the destination MAC address field 1125. Also, leaf switch 1030 inserts the VLAN identifier for server 1010 (VLAN2) in the VLAN field 1115.

Leaf switch 1030 then encapsulates packet 1165' to form packet 1170 by inserting VNI field 1130, IP address of leaf switch 1030 in the source IP address field 1135, IP address of leaf switch 1040 in the destination IP address field 1140, MAC address of leaf switch 1030 in the source MAC address field 1145 and MAC address of spine switch 1050 in the destination MAC address field 1150. Leaf switch 1030 sends packet 1170 to spine switch 1060.

After spine switch 1060 receives packet 1170, it forms packet 1170' by inserting MAC address of spine switch 1060 into the source MAC address field 1145 and MAC address of leaf switch 1040 in the destination MAC address field 1150. Spine switch 1060 sends packet 1170' to leaf switch 1040.

Leaf switch 1040 receives packet 1170', and forms packet 1180 by stripping off fields 1130, 1135, 1140, 1145 and 1150 and inserting the MAC address of leaf switch 1040 into the source MAC address field 1120. Leaf switch 1040 sends packet 1180 to the server 1010.

Figure 16:
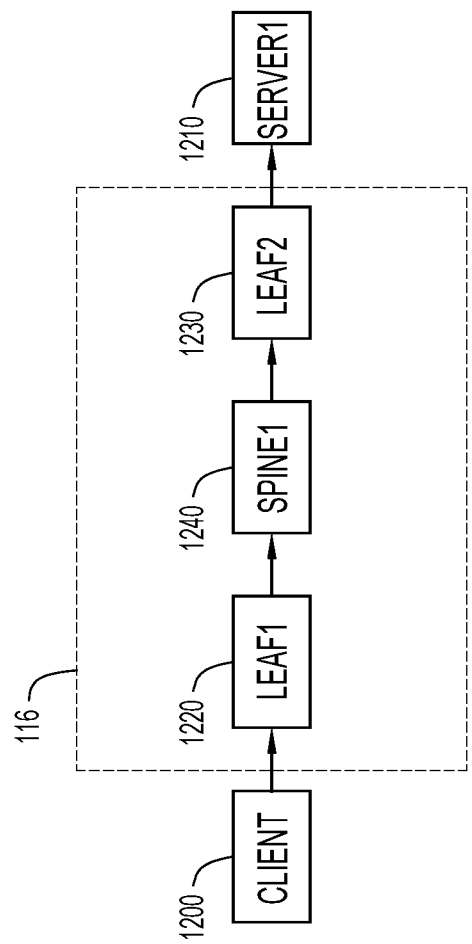
FIG. 16 is a simplified diagram showing a deployment example for Direct Server Return Load Balancing (DSR LB), according to an example embodiment.

Turning now to FIG. 16, still another example deployment scenario is shown, and particular a DSR LB example. In this example, a client 1200 is sending traffic to a server 1210 via switch fabric 116. Switch fabric 116 includes leaf switches 1220 and 1230 and a spine switch 1240. The client 1200 and the server 1210 are in different subnets. Leaf switch 1220 is perform the router/SVI functions, and is load balancing to a plurality of servers, of which server 1210 is a part. The servers and leaf switches share a subnet.

Figure 17:
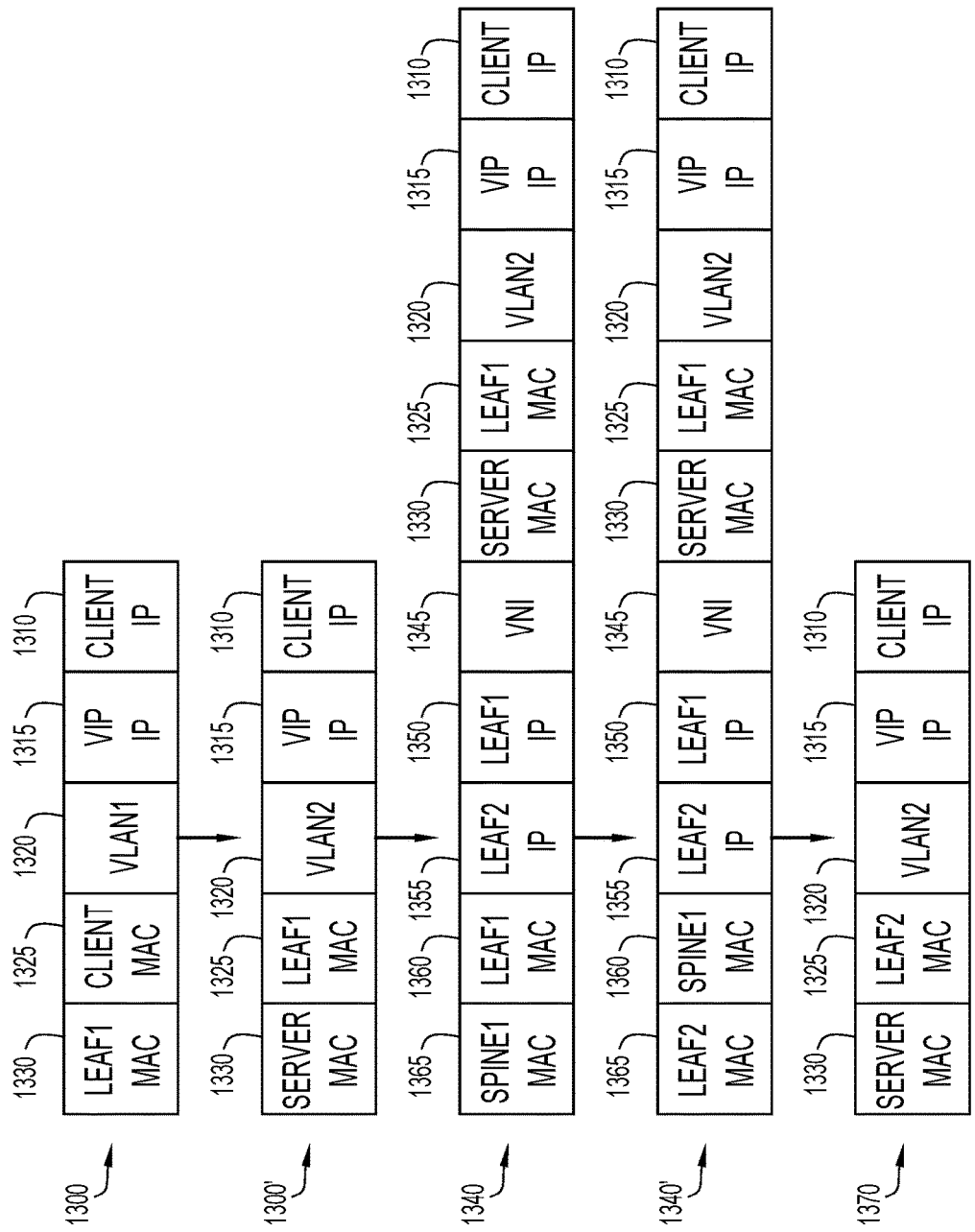
FIG. 17 illustrates the packet encapsulations for packet flows from a client to a server in the deployment example of FIG. 16.
Figure 18:
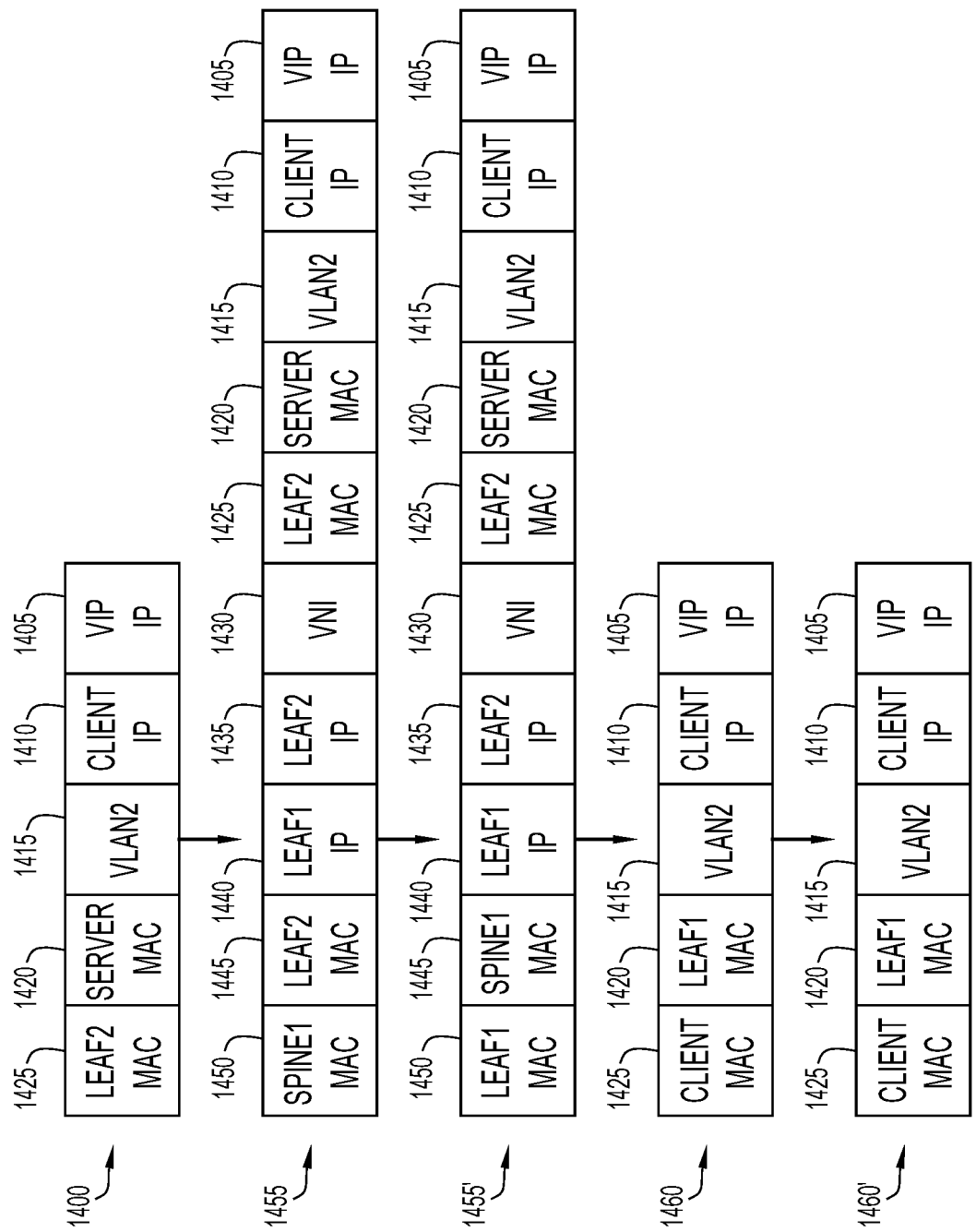
FIG. 18 illustrates the packet encapsulations for packet flows from the server to a client in the deployment example of FIG. 16.

FIG. 17 illustrates the packet flow in a forward direction from the client 1200 to the server 1210, and FIG. 18 illustrates the packet flow in a reverse direction from the server 1210 to the client 1200.

Referring first to FIG. 17, the packet sent from the client 1200 is shown at 1300, and includes a source IP address field 1310 that is client's IP address, a VIP address as the destination IP address 1315 used by the client to identify its traffic in the network, a VLAN field 1320 (specifying VLAN1), a source Media Access Control (MAC) address field 1325 filled with the client's MAC address and a destination MAC address field 1330 filled with the MAC address of leaf switch 1220.

When the leaf switch 1220 receives packet 1300, it maintains fields 1310 and 1315 as they are (does not rewrite the VIP address to the server IP address). The leaf switch 1220 rewrites the VLAN field 1320 with the VLAN identifier of the server's VLAN, VLAN 2, rewrites the source MAC address field 1325 with the MAC address of the leaf switch 1220 and rewrites the destination MAC address field 1330 with the MAC address of the server 1210. The resulting packet is shown at 1300'.

Next, the leaf switch 1220 forms the encapsulated packet 1340 that it sends to the spine switch 1340. The encapsulated packet 1340 includes all of the fields of packet 1300', plus a virtual network identifier (VNI) field 1345, a source IP address field 1350 containing the IP address of leaf switch 1220, a destination IP address field 1355 containing the IP address of leaf switch 1230, a source MAC address field 160 containing the MAC address of leaf switch 1220 and a destination MAC address field 1265 containing the destination MAC address of spine switch 1240. Leaf switch 1220 sends packet 1240 to spine switch 1240.

Spine switch 1240 receives packet 1340 and forms packet 1340' that includes all the same fields packet 1340 except that the source MAC address field 1360 is populated with the MAC address of the spine switch 1240, and the destination MAC address field 1365 is populated with the MAC address of the leaf switch 1230. The spine switch 1240 sends packet 1340' to the leaf switch 1230.

When the leaf switch 1230 receives packet 1340', it decapsulates the packet and strips off the fields 1345, 1350, 1355, 1360 and 1365. Leaf switch 1230 then inserts in the destination IP address field 1335 the VIP address associated with the client's traffic, inserts in the VLAN field 1340 the VLAN identifier (VLAN2) for the VLAN of which the server is a part, inserts in the source MAC address field 1345 the MAC address of leaf switch 1230 and inserts in the destination MAC address field 1350 the MAC address of the server 1210. The resulting packet is shown at 1370 and the leaf switch 1230 sends it to the server 1210.

Reference is now made to FIG. 18. The packet sent by the server 1210 is shown at 1400, and includes a source IP address field 1405 populated with the VIP address, a destination IP address field 1410 populated with the client's IP address, a VLAN identifier field 1415 populated with the VLAN identifier (VLAN2) for the VLAN in which the server resides, a source MAC address field 1420 containing the server's MAC address and a destination MAC address 1425 containing the MAC address of leaf switch 1230.

When the packet 1400 reaches leaf switch 1230, leaf switch 1230 encapsulates packet 1400 so that it is directed to the spine switch 1240. Specifically, leaf switch 1230 adds the VNI field 1430, source IP address field 1435 containing the IP address for leaf switch 1230, destination IP address field 1440 containing the IP address for leaf switch 1220, source MAC address field 1445 containing the MAC address for leaf switch 1230 and destination MAC address field 1450 containing the MAC address for spine switch 1240. The resulting encapsulated packet is shown at 1455. The leaf switch 1230 sends packet 1455 to the spine switch 1240.

When the spine switch 1240 receives packet 1455, it replaces the MAC address of the leaf switch 1220 in source MAC address field 1445 with the MAC address of the spine switch 1240 and replaces the MAC address of the spine switch in the destination MAC address field 1450 with the MAC address of leaf switch 1220. Spine switch 1240 then sends packet 1455' to leaf switch 1220.

When leaf switch 1220 receives packet 1455', it decapsulates packet 1455' removing fields 1430, 1435, 1440, 1445 and 1450. Then, the leaf switch 1220 fills in the source MAC address field 1420 with the MAC address of leaf switch 1220 and fills the destination MAC address field 1425 with the MAC address of the client, producing packet 1460. Then, before sending it to the client, the leaf switch 1220 inserts the VLAN identifier (VLAN1) where the client resides, in VLAN field 1415. Note that the VIP address in source IP address field 1405 is left alone. The leaf switch 1220 sends the resulting packet 1460' sent to the client.

Another example deployment scenario is a DSR LB scenario similar to the one shown in FIGS. 16-18, but where the client and the server are in the same submit. In that case, the link between the two leaf switches is a tunnel. The first leaf switch does the load balancing to the servers.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

The steps in the preceding flow diagram illustrates only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure In summary, in one form, a method is provided comprising: in a switch fabric that includes a plurality of switches, receiving a packet at a first switch of the plurality of switches; at the first switch, load balancing the packet to a particular entity among a plurality of entities, each of which is connected to one of the plurality of switches, by determining a particular switch of the plurality of switches to which the packet should be directed, the particular entity being connected to the particular switch of the plurality of switches; receiving the packet at the particular switch; and at the particular switch, determining which interface of the particular switch to direct the packet to the particular entity.

In another form, a system is provided comprising: a switch fabric that includes a plurality of switches; a plurality of entities, each of which is connected to one of the plurality of switches; a first switch of the plurality of switches configured to: receive a packet into the switch fabric; load balance the packet to a particular entity among the plurality of entities by determining a particular switch of the plurality of switches to which the packet should be directed, the particular entity being connected to the particular switch of the plurality of switches; the particular switch configured to: receive the packet from the first switch; determine which interface of the particular switch to direct the packet to the particular entity.

In still another form, a system is provided comprising: a switch fabric that includes a plurality of switches; a plurality of entities, each of which is connected to one of the plurality of switches; wherein each switch includes a first memory that stores entries for one or more attributes of match criteria associated with ingress traffic received by the first switch, and a second memory that stores entries describing networking actions to be performed for each corresponding entry of the first memory; wherein for handling ingress traffic to the switching fabric, each switch is configured to store entries in the second memory that include an identifier of one of the plurality of switches to which a packet received by the first switch is to be directed; and wherein for handling egress traffic from the switching fabric, each switch is configured to store entries in the second memory that include an identifier of an interface of the switch to which a packet received by the switch is to be directed.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Along similar lines, communication system 100 can be extended to any communications involving network elements, where the present disclosure is explicitly not confined to unicasting and multicasting activities.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   in a switch fabric that includes a plurality of switches, at least two switches of the plurality of switches configured to load balance, receiving a packet at a first switch of the plurality of switches, wherein the plurality of switches include leaf switches and spine switches such that each of the leaf switches is connected to each of the spine switches, and wherein ingress traffic to the switch fabric is received at one of the leaf switches and egress traffic from the switch fabric is sent via one of the leaf switches, and traffic sent internally in the switch fabric between leaf switches flows through at least one of the spine switches, and wherein a plurality of entities are each connected to one of the leaf switches;
   at the first switch, load balancing the packet to a particular entity among the plurality of entities, each of which is connected to one of the plurality of switches, by determining a particular leaf switch of the plurality of switches to which the packet should be directed, the particular entity being connected to the particular leaf switch of the plurality of switches;

receiving the packet at the particular leaf switch;
at the particular leaf switch, determining which interface of the particular leaf switch to direct the packet to the particular entity; and
at the particular entity, directing the packet to another entity of the plurality of entities via one or more switches including at least the particular leaf switch.

2. The method of claim 1, wherein at the first switch, load balancing includes:
first examining a first memory that stores entries for one or more attributes of match criteria associated with ingress traffic received by the first switch to determine whether an attribute of the packet matches any entry of the first memory; and
second examining a second memory that store entries describing networking actions to be performed for each corresponding entry of the first memory, wherein each entry of the second memory includes an identifier of one of the plurality of switches to which a packet received by the first switch is to be directed.

3. The method of claim 2, wherein the one or more attributes of match criteria stored in each entry of the first memory of the first switch includes one of: an address range for a source address of the packet or an address range for a destination address of the packet.

4. The method of claim 2, wherein at the particular leaf switch, determining includes:
first examining a first memory of the particular leaf switch that stores entries for attributes of match criteria associated with traffic received by the particular leaf switch to determine whether an attribute of the packet matches any entry of the first memory; and
second examining a second memory of the particular leaf switch that stores entries describing networking actions to be performed for each corresponding entry of the first memory, wherein each entry of the second memory includes an identifier of an interface of the particular leaf switch to which a packet received by the particular leaf switch is to be directed so that the packet is sent to the particular entity.

5. The method of claim 4, wherein the one or more attributes of match criteria stored in each entry of the first memory of the particular leaf switch includes one of: an address range for a source address of the packet or an address range for a destination address of the packet.

6. The method of claim 1, wherein the load balancing includes non-Direct Server Return Server Load Balancing.

7. The method of claim 1, wherein the particular leaf switch and the first switch are the same switch, or the particular leaf switch and the first switch are different switches of the plurality of switches.

8. The method of claim 1, wherein the switch fabric acts as a massive load-balancer, and the plurality of entities include clients, servers and Layer 4-Layer 7 network appliances that are physical devices or virtual machines that may be connected anywhere in the switch fabric.

9. A system comprising:
a switch fabric that includes a plurality of switches, at least two switches of the plurality of switches configured to load balance, wherein the plurality of switches each include memory, wherein the plurality of switches include leaf switches and spine switches such that each of the leaf switches is connected to each of the spine switches, and wherein ingress traffic to the switch fabric is received at one of the leaf switches and egress traffic from the switch fabric is sent via one of the leaf switches, and traffic sent internally in the switch fabric between leaf switches flows through at least one of the spine switches;
a plurality of entities, each of which is connected to one of the leaf switches;
a first switch of the plurality of switches configured to:
receive a packet into the switch fabric;
load balance the packet to a particular entity among the plurality of entities by determining a particular leaf switch of the plurality of switches to which the packet should be directed, the particular entity being connected to the particular leaf switch of the plurality of switches;
the particular leaf switch configured to:
receive the packet from the first switch;
determine which interface of the particular leaf switch to direct the packet to the particular entity; and
the particular entity configured to:
direct the packet to another entity of the plurality of entities via one or more switches including at least the particular leaf switch.

10. The system of claim 9, wherein the first switch load balances using non-Direct Server Return Server Load Balancing.

11. The system of claim 9, wherein the first switch includes a first memory that stores entries for one or more attributes of match criteria associated with ingress traffic received by the first switch, and a second memory that stores entries describing networking actions to be performed for each corresponding entry of the first memory, wherein each entry of the second memory includes an identifier of one of the plurality of switches to which a packet received by the first switch is to be directed, and wherein the first switch is configured to load balance by:
first examining the first memory to determine whether an attribute of the packet matches any entry of the first memory; and
second examining the second memory to determine an identifier of one of the plurality of switches the packet received by the first switch is to be directed.

12. The system of claim 11, wherein the one or more attributes of match criteria stored in each entry of the first memory of the first switch includes one of: an address range for a source address of the packet or an address range for a destination address of the packet.

13. The system of claim 9, wherein the particular leaf switch includes a first memory that stores entries for attributes of match criteria associated with traffic received by the particular leaf switch, and a second memory that stores entries describing networking actions to be performed for each corresponding entry of the first memory of the particular leaf switch, wherein each entry of the second memory includes an identifier of an interface of the particular leaf switch to which a packet received by the particular leaf switch is to be directed, and wherein the particular leaf switch is configured to determine which interface of the particular leaf switch to direct the packet by:
first examining the first memory of the particular leaf switch to determine whether an attribute of the packet matches any entry of the first memory; and
second examining the second memory to determine which interface of the particular leaf switch the packet is to be directed.

14. The system of claim 13, wherein the one or more attributes of match criteria stored in each entry of the first memory of the particular leaf switch includes one of: an address range for a source address of the packet or an address range for a destination address of the packet.

15. The system of claim 9, wherein the particular leaf switch and the first switch are the same switch, or the particular leaf switch and the first switch are different switches of the plurality of switches.

16. The system of claim 9, wherein the switch fabric acts as a massive load-balancer, and the plurality of entities include clients, servers and Layer 4-Layer 7 network appliances that are physical devices or virtual machines that may be connected anywhere in the switch fabric.

17. A system comprising:
a switch fabric that includes a plurality of switches, at least two switches of the plurality of switches configured to load balance, wherein the plurality of switches include leaf switches and spine switches such that each of the leaf switches is connected to each of the spine switches, and wherein ingress traffic to the switch fabric is received at one of the leaf switches and egress traffic from the switch fabric is sent via one of the leaf switches, and traffic sent internally in the switch fabric between leaf switches flows through at least one of the spine switches;
a plurality of entities, each of which is connected to one of the leaf switches;
wherein each leaf switch includes a first memory that stores entries for one or more attributes of match criteria associated with ingress traffic received by the leaf switch, and a second memory that stores entries describing networking actions to be performed for each corresponding entry of the first memory;
wherein for handling ingress traffic to the switching fabric, each leaf switch is configured to store entries in the second memory that include an identifier of one of the plurality of switches to which a packet received by the leaf switch is to be directed;
wherein for handling egress traffic from the switching fabric, each leaf switch is configured to store entries in the second memory that include an address of a particular entity to which a packet received by the leaf switch is to be directed; and
wherein the particular entity applies a networking action to each packet and directs the packet to another entity of the plurality of entities via one or more switches including the leaf switch that received the packet.

18. The system of claim 17, wherein the switch fabric acts as a massive load-balancer, and the plurality of entities include clients, servers and Layer 4-Layer 7 network appliances that are physical devices or virtual machines that may be connected anywhere in the switch fabric.

19. The system of claim 17, wherein a leaf switch is configured to load balance by:
first examining the first memory to determine whether an attribute of the packet matches any entry of the first memory; and
second examining the second memory to determine an identifier of one of the plurality of switches the packet received by the leaf switch is to be directed; wherein a leaf switch is configured to determine which interface to direct the packet by:
first examining the first memory to determine whether an attribute of the packet matches any entry of the first memory; and
second examining the second memory to determine which interface of the leaf switch the packet is to be directed.

20. The system of claim 19, wherein the one or more attributes of match criteria stored in each entry of the first memory of the leaf switch includes one of: an address range for a source address of the packet or an address range for a destination address of the packet.

* * * * *